United States Patent
Huang et al.

(10) Patent No.: US 10,337,309 B2
(45) Date of Patent: Jul. 2, 2019

(54) METHOD FOR REFRACTURING A WELLBORE AND LOW MOLECULAR WEIGHT COMPOSITIONS FOR USE THEREIN

(71) Applicant: NewWell Tech, LLC, Houston, TX (US)

(72) Inventors: Zhijie Huang, Sugar Land, TX (US); Jiaher Tian, Sugar Land, TX (US)

(73) Assignee: NewWell Tech, LLC, Houston, TX (US)

(*) Notice: Subject to any disclaimer, the term of this patent is extended or adjusted under 35 U.S.C. 154(b) by 0 days.

(21) Appl. No.: 15/960,158

(22) Filed: Apr. 23, 2018

(65) Prior Publication Data

US 2018/0313199 A1    Nov. 1, 2018

Related U.S. Application Data

(60) Provisional application No. 62/569,678, filed on Oct. 9, 2017, provisional application No. 62/491,328, filed on Apr. 28, 2017.

(51) Int. Cl.
| | | |
|---|---|---|
| *E21B 43/26* | (2006.01) | |
| *E21B 43/267* | (2006.01) | |
| *C09K 8/516* | (2006.01) | |
| *C09K 8/512* | (2006.01) | |
| *C09K 8/62* | (2006.01) | |

(52) U.S. Cl.
CPC ............ *E21B 43/261* (2013.01); *C09K 8/512* (2013.01); *C09K 8/516* (2013.01); *C09K 8/62* (2013.01); *E21B 43/267* (2013.01)

(58) Field of Classification Search
CPC ...... E21B 43/261; E21B 43/267; C09K 8/512; C09K 8/516
USPC ........................................................ 166/281
See application file for complete search history.

(56) References Cited

U.S. PATENT DOCUMENTS

| | | | | |
|---|---|---|---|---|
| 4,109,721 A | * | 8/1978 | Slusser ................... | C09K 8/80 166/280.1 |
| 5,273,115 A | * | 12/1993 | Spafford ............... | E21B 43/261 166/281 |
| 7,331,390 B2 | | 2/2008 | Eoff et al. | |
| 2007/0249504 A1 | * | 10/2007 | Ballard .................. | C09K 8/203 507/207 |
| 2014/0090847 A1 | * | 4/2014 | Liang ..................... | C09K 8/508 166/305.1 |

(Continued)

OTHER PUBLICATIONS

Diakhate, et al., "Refracturing on Horizontal Wells in the Eagle Ford Shale in South Texas—One Operator's Perspective", In Proceedings of SPE Hydraulic Fracturing Technology Conference, Feb. 3-5, 2015, The Woodlands, Texas, USA, 18 pages.

(Continued)

*Primary Examiner* — Silvana C Runyan
(74) *Attorney, Agent, or Firm* — Childs Law

(57) ABSTRACT

The present invention provides a methodology and compositions for re-fracturing a wellbore. By differentiating existing perforations that have been fractured from those that are not, applying a sealing composition to seal off the identified, fractured perforations, and performing re-fracturing to perforations that are not sealed, a wellbore can be re-fractured effectively and efficiently. The present invention for re-fracturing a wellbore has broad applications in the field of hydraulic fracturing.

12 Claims, 12 Drawing Sheets

(56) References Cited

U.S. PATENT DOCUMENTS

2016/0003021 A1* 1/2016 Nelson .................. E21B 43/267
166/280.2
2016/0333680 A1* 11/2016 Richter .................. E21B 43/26

OTHER PUBLICATIONS

Sun, et al., "Understanding the 'frac-hits' impact on a Midland basin tight-oil well production", In Proceedings of the Unconventional Resources Technology Conference, Jul. 24-26, 2017, Austin, Texas, USA, 12 pages.

Liang, et al., "Fracture Hit Monitoring and Its Mitigation Through Integrated 3D Modeling in the Wolfcamp Stacked Pay in the Midland Basin", In Proceedings of the Unconventional Resources Technology Conference, Jul. 24-26, 2017, Austin, Texas, USA, 16 pages.

Kumar, et al., "3D Geomechanical Analysis of Refracturing of Horizontal Wells", In Proceedings of the Unconventional Resources Technology Conference, Jul. 24-26, 2017, Austin, Texas, USA, 14 pages.

Suo, et al., "Investigation of Production-Induced Stress Changes for Infill Well Stimulation in Eagle Ford Shale", In Proceedings of the Unconventional Resources Technology Conference, Jul. 24-26, 2017, Austin, Texas, USA, 20 pages.

Ajisafe, et al., "Impact of Well Spacing and Interference on Production Performance in Unconventional Reservoirs, Permian Basin", In Proceedings of the Unconventional Resources Technology Conference, Jul. 24-26, 2017, Austin, Texas, USA, 16 pages.

Huang, et al., "Modeling well interference and optimal well spacing in unconventional reservoirs using the fast marching method", In Proceedings of the Unconventional Resources Technology Conference, Jul. 24-26, 2017, Austin, Texas, USA, 21 pages.

McFall, et al., "Refracturing in the Eagle Ford Shale: One Operator's Quest to Identify and Rank Candidates, Minimize Well Interference, and Understand Variability of Results", In Proceedings of the Unconventional Resources Technology Conference, Jul. 24-26, 2017, Austin, Texas, USA, 14 pages.

Li, et al., "Lessons Learned from Refractured Wells: Using Data to Develop an Engineered Approach to Rejuvenation", In Proceedings of SPE Hydraulic Fracturing Technology Conference, Feb. 9-11, 2016, The Woodlands, Texas, USA, 17 pages.

Craig, et al., "Barnett Shale Horizontal Restimulations: A Case Study of 13 Wells", In Proceedings of the Americas Unconventional Resources Conference, Jun. 5-7, 2012, Pittsburgh, Pennsylvania, USA, 15 pages.

Jacobs, Trent, "Renewing Mature Shale Wells Through Refracturing", Published in JPT, Apr. 2014, 6 pages.

Manchanda, et al., "Overcoming the Impact of Reservoir Depletion to Achieve Effective Parent Well Refracturing", In Proceedings of the Unconventional Resources Technology Conference, Jul. 24-26, 2017, Austin, Texas, USA, 14 pages.

Abass, et al., "Nonplanar Fracture Propagation From a Horizontal Wellbore: Experimental Study", Published in SPE Production & Facilities, Aug. 1996, 5 pages.

El Rabaa, W., "Experimental Study of Hydraulic Fracture Geometry Initiated from Horizontal Wells", In Proceedings of the 64th Annual Technical Conference and Exhibition of the Society of Petroleum Engineers, Oct. 8-11, 1989, San Antonio, Texas, USA, 16 pages.

Kim, et al., "Hydraulic fracture initiation from horizontal wellbores: Laboratory experiments", Published in Rock Mechanics as a Multidisciplinary Science, Roegiers, 1991, Balkema, Rotterdam, 10 pages.

McDaniel, et al., "Proper Use of Proppant Slugs and Viscous Gel Slugs Can Improve Proppant Placement During Hydraulic Fracture Applications", In Proceedings of the 2001 SPE Annual Technical Conference and Exhibition, Sep. 30-Oct. 3, 2001, 16 pages.

Cameron, J., "Refracturing horizontal shale wells with solid-steel expandable liners", Published in World Oil, Aug. 2013, pp. 39-52.

Walser, Doug, "Leveraging Subsurface Insight, Screening, and Diversion Technology in Refracturing", Published in JPT, Jan. 2016, 3 pages.

Allison, et al., "Restimulation of Wells using Biodegradable Particulates as Temporary Diverting Agents", In Proceeding of the Canadian Unconventional Resources Conference, Nov. 15-17, 2011, Calgary, Alberta, Canada, 11 pages.

Walker, et al., "Engineered Perforation Design Improves Fracture Placement and Productivity in Horizontal Shale Gas Wells," In Proceedings of SPE Americas Unconventional Resources Conference, Jun. 5-7, 2012, Pittsburgh, Pennsylvania, USA, 7 pages.

Wang, et al, "What We Learned from a Study of Re-fracturing in Barnett Shale: An Investigation of Completion/Fracturing, and Production of Re-fractured Wells," In Proceedings of the International Petroleum Technology Conference, Mar. 26-28, Beijing, China, 2013, 18 pages.

Long, et al., "Modeling of Perforation Erosion for Hydraulic Fracturing Applications," In Proceedings of SPE Annual Technical Conference and Exhibition, Sep. 28-30, 2015, Houston, Texas, USA, 14 pages.

Ugueto C., et al, "Perforation Cluster Efficiency of Cemented Plug and Perf Limited Entry Completions; Insights from Fiber Optics Diagnostics", In Proceedings of SPE Hydraulic Fracturing Technology Conference, Feb. 9-11, 2016, The Woodlands, Texas, USA, 17 pages.

Vincent, M.C., "Refracs—Why Do They Work, and Why Do They Fail in 100 published field studies?", In Proceedings of SPE Annual Technical and Exhibition, Sep. 19-22, 2010, Florence, Italy, 45 pages.

Rezaei, Ali, "Protection Refrac: Analysis of Pore Pressure and Stress Change Due to Refracturing of Legacy Wells", In Proceedings of the Unconventional Resources Technology Conference, Jul. 24-26, 2017, Austin, Texas, USA, 16 pages.

Jayakumar, et al., "A Systematic Study for Refracturing Modeling under Different Scenarios in Shale Reservoirs", In Proceedings of the SPE Eastern Regional Meeting, Aug. 20-22, 2013, Pittsburgh, Pennsylvania, USA, 12 pages.

Potapenko, et al., "Barnett shale refracture stimulations using a novel diversion technique", In Proceedings of the 2009 SPE Hydraulic Fracturing Technology Conference, Jan. 19-21, 2009, The Woodlands, Texas, USA, 11 pages.

Grieser, et al, "Lessons Learned: Refracs from 1980 to present", In Proceedings of SPE Hydraulic Fracturing Technology Conference, Feb. 9-11, 2016, The Woodlands, Texas, USA, 24 pages.

French, et al., "Re-fracturing Horizontal Shale Wells: Case History of a Woodford Shale Pilot Project", In Proceedings of SPE Hydraulic Fracturing Technology Conference, Feb. 4-6, 2014, The Woodlands, Texas, USA, 24 pages.

Melcher, et al., "Restimulation Design Considerations and Case Studies of Haynesville Shale", In Proceedings of the SPE Annual Technical Conference and Exhibition, Sep. 28-30, 2015, Houston, Texas, USA, 21 pages.

* cited by examiner

METHOD FOR REFRACTURING A WELLBORE AND LOW MOLECULAR WEIGHT COMPOSITIONS FOR USE THEREIN

FIELD OF INVENTION

The present invention relates generally to hydraulic fracturing, and in particular, to hydraulic fracturing on a wellbore that has previously been hydraulically fractured. In one embodiment, the present invention is a method of re-fracturing a wellbore.

BACKGROUND OF THE INVENTION

In North America, tens of thousands of horizontal wells have been drilled in shales like Barnett, Haynesville, Woodford, Eagle Ford, Marcellus, Bakken, Utica, Wolfberry, etc. The majority of these wells are multistage fracture jobs. It is estimated that the average production of shale oil and gas wells drops below an economical rate after 5 to 6 years with only 8% of the reserved oil and gas recovered (1). Many of these wells are candidates for refrac to bring them back to economical production, and increase recover rate of the reservoir.

One of the most common reasons making refracturing beneficiary is simply the rapid evolution of the standard frac design. For many shale plays, the frac design that is being applied today is significantly improved from the original frac design years ago. In one study on the viability of refracturing in the Barnett, vertical wells in core areas were restimulated with an updated design that included: higher rates, more fluid, less pad volume, and smaller proppant (2).

Secondly, it is also very common that some of the reservoirs are not treated effectively during the original fracturing treatment because of formation heterogeneity, stress shadow, and ineffectiveness of limited entry (3), thus creating reservoir bypassed from production. For many of the horizontal wells, it is generally believed that roughly ⅓ of the wellbore contributes to 75% of the production. A study of perforation cluster efficiency found that although there was enough pressure to initiate fracs within each cluster, some clusters stop receiving proppant during the treatment (4). In the study, there were three clusters in stage 4, denoted by 4.1, 4.2, and 4.3. It was found that fractures were initiated in all three clusters with real time temperature measurement which would indicate which zones are taking fluid due to the observed cooldown. Through the use of acoustic measurement, proppant placement is a variable that is able to be measured and it was found that as proppant placement increased, toe cluster 4.1 stopped taking prop and eventually stopped taking fluid. Cluster 4.2 stopped taking proppant right at the start of resin coated proppant hitting bottom, mitigating its usefulness as being part of the proppant design. Heel cluster 4.3 segment of the horizontal was taking fluid and proppant throughout the treatment. Reported in that publication, it is estimated that cluster efficiency is only between 50% to 70%. Additionally, the study found that completions with reduced clusters are more efficient, and cluster efficiency decreases as cluster spacing decreases.

In addition to low cluster efficiency, some fractures only contribute to production for a short time post-frac, which further worsens the reservoir by-pass problem as shown below in an Eagle Ford well with 9 frac stages (5). Microseismic data demonstrated that most fracs occurred within stages 5 to 9. Chemical tracers were monitored for 35 days after flowback, and again 3 years after production. Analysis revealed that stages 4 and 8 stopped contributing during the first three weeks of flowback, contribution from stage 3 stopped after four weeks of flowback, and there was no production contribution from stages 1 and 2. On the other hand, stages 5 and 9 contributed over 80% of production.

A refracturing treatment could access these bypassed reservoir sections through many mechanisms such as: enhancing reservoir contact, increasing height or lateral pay zone coverage, restoring fracture conductivity, and fracture reorientation due to stress change. (6)

Refrac could also be valid treatment for parent-child well interference. As shale basins switch from exploration to the development phase by drilling in-fill wells, frac hit could happen. Frac hits are defined as the invasion of fracturing fluids into an existing producer, usually a parent well, while a neighboring well, usually the child well, is being fractured (7). This interference could have two negative impacts: it often creates child wells that only reach 60% or less production performance compared to parent well, and a frac hit to the parent well can decrease its production after frac the child well(s). An example of a frac hit is shown (8). As the offset wells are fractured, the water production of parent well increases, while oil production decreases, and does not recover. Numerous reasons cause this parent-child interference including stress reversal, child well fractures tending to grow towards the parent well, and improper parent-child well spacing (9, 10). The longer the parent well has been on production, the higher the likelihood of an induced stress change, resulting in a higher probability of well interference. It is suggested to start infill drilling within two years of a parent well's production to minimize infill interference. However, for many wells, that window has already closed. Although it is possible to optimize frac designs of the child well with modeling (11, 12), an accurate model requires a substantial amount of data such as logging, microseismic, and bottom hole pressure, which were often not collected in the original frac treatment.

Refracturing the parent well can reduce the probability of parent-child interference by both protecting the parent well's susceptibility of taking a frac hit and allowing uniform fracture growth in child wells by reducing the tendency of new frac growth toward a low pressure zone through recharging its internal fracture pressures (13, 14). To ensure a successful infill completion program, a refrac of the parent well should be incorporated while trying to frac the child well.

Refrac can also be used to rejuvenate the lost proppant conductivity of the old fractures. Production cycling, scale, fines plugging, proppant crushing, embedment, proppant degradation all lead to a reduction in fracture conductivity. A refrac may give the well a fresh boost by injecting new propping agents within previously fractured formations suffering conductivity loss.

Examples of Refracturing Results

With untapped reservoir sections bypassed, significant hydrocarbons being left in-situ, and more proppant and fluid placed during the refrac, some reservoir analysts expect post-refrac wells should restore the IP and flow pressure to original post-frac levels, if not better. Results from reservoir simulations support the benefits of refracturing (15), however the result of actual cases does not always conform with the reservoir simulations results.

As generally known in the art, there are two main issues with post refrac results, refrac production comes in under expectation, and the unrepeatability of production post-refrac. As noted below, some refractured wells can demonstrate a healthy production increase, while others demonstrate barely any production increase even in the same geographic area. Below are some examples of refrac production compared to first frac (16).

Devon published a paper about refracturing thirteen wells in Barnett (17). Computer simulations and historical matching predicted high post frac rates and significantly higher flowing pressures after the refrac due to the presence of high pressure, undepleted areas between the existing fracture networks. In reality, these high rates and pressures were not realized after the refrac due partially to the various methods of attempting to control the placement of the stimulation that appeared to be ineffective.

Additionally, a review paper published in JPT mentioned the lack of reliable refrac technology and possible operational and economic risks with the 2 to 3-million-dollar investment for a refrac treatment (18).

In summary, each of these examples of published industry evaluations demonstrates both the unrepeatability of refracturing and the possible volatile economic investments potential when re-investing into a previously completed well.

It should be also realized that when shale fracturing developed in the last 15 years, the initial multiple fracturing practice never considered the refracturing possibility, thus leaving this vast and challenging problem to date. When creating a refrac method, it is important to keep this in mind and develop a method that can re-fracture wells repeatedly, and thus eliminate possible problems in the future.

Main Challenge of Refrac

Based on the previous reviews, it is obvious that plenty of hydrocarbons remained in the reservoir after production from the initial hydraulic fracture treatment. However, in many cases, a following refrac treatment failed to recover the remaining hydrocarbon resources. To effectively extract these hydrocarbons, the reservoir rocks that were not fractured during the first hydraulic fracture treatment need to be fractured. This process requires creating new fractures during the refrac process, not just open new surface area along the old fractures. Nevertheless, it is difficult to create new fractures in refrac program due to several reasons.

Firstly, due to the ultra-low matrix permeability, several years of production can cause a significant reservoir pressure drop around old fractures (19). The pore pressure within this zone can be four to five thousand psi lower than the areas not fractured. Therefore, it is quite common to observe lower frac gradients during a refrac compared to the original treatment, which indicates the dilation of old fractures instead of growth through fluid and proppant placement within new fractures.

Complexity of fracture near wellbore area also making it hard to isolate the old fracture in order to create new fractures. Horizontal drilling programs typically aim to drill along the minimum horizontal stress to allow fractures to grow transverse to wellbore. However, in the near wellbore area region, fractures do not always propagate immediately in a transverse manner. Characteristics such as perforation phasing, perforation length, cementing micro-annuli, NWB stress concentration zones, and natural or induced microfractures alter the in-situ state of stress to create a new, incongruous stress field near the wellbore. For example, Abass (20) and El Rabaa (21) each demonstrated how certain characteristics influence the initial NWB geometry of a forming fracture. Abass demonstrated, by experimentation, that because of this near-wellbore stress field, a fracture has the tendency to initiate along the wellbore at the high and low sides of the wellbore eventually reorienting itself to grow perpendicular to minimum horizontal stress and transitioning into the dominant fracture after leaving near wellbore area. El Rabaa demonstrated, by experiment, that multiple fractures were created in the NWB area before converging to create a single dominate fracture, when the perforated interval was greater than four well-bore diameters, and the deviation angle is less than 75 degrees.

Kim and Abass (22) showed that for wells with high deviation angles, a pair of mutually perpendicular fractures was created thereby further increasing the complexity of the NWB region.

From these studies and numerous other publications (23), the industry believes the complexity of fractures is quite well established in near wellbore area yet most of these fractures will stop growing after leaving near wellbore region and generate a dominate fracture as it seeks its natural orientation of being perpendicular towards the minimum stress.

Current Methods and Limitations

The problem with each of current refrac methods is that they focus on blocking the entrance point of the fracture and do not penetrate past the NWB region. This makes it very likely to frac into old fractures through one of the pathways of the complex NWB networks, making it hard to create new fractures.

Cementing Method

In the cementing method, cement materials are used to seal off all current perforations (17). After the cement hardens, the cement left in wellbore can be drilled out. This leaves a full wellbore ready for refrac operation. The advantages of this method are that cement is very cheap, and after setting, is very hard. The disadvantage of this method is that cement contains solid particles. When squeezing cementing material into an existing fracture, the cement bridges over the proppant pack. Thus, it achieves very shallow penetration into the proppant pack. Fractures around near a wellbore area are very complex, and normally there are multiple fractures leading to the main fracture. With shallow penetration, the chance to seal off all pathways leading to the main fracture is low. Also, cement shrinks when set, thus the seal may leak. Field experience shows that using cement to squeeze off perforation is very unreliable. Many times, it fails to seal. Also, some of the cementing material will be left in wellbore. After it hardens, it is very hard to clean the cement.

Coil Tubing with Straddle Packer

The straddle packer isolates part of the wellbore from the rest of the wellbore, so that proppant and fluid are only injected into one section of the wellbore. With this method, the entire refrac job needs to be pumped down coil tubing; thus, the pumping rate is limited due to pipe friction. This often influences the result of the fracture treatment. Many times, a high rate is desired to generate the fracture geometry. Also, proppant concentration can be increased with a higher pumping rate. Thus, it takes much longer to pump the same amount of fluid and proppant with a lower rate, which increases operational cost. Also, there is a high risk of getting the coil tubing stuck during refrac, which can either cause total abandonment of the well, or a significant time investment to get the coil tubing free.

Jet Nuzzle With Coil Tubing

Jet nozzles combined with the use of drill pipe/coiled tubing, materials that effectively seal or create a pressure drop when pumped into an open perforation. The drawbacks of this method are similar to the coil tubing with straddle packer method. It is risky, with low rate, and increased operational cost.

Sliding Sleeve Multi-Stage Tool

The sliding sleeve multi-stage tool is composed of sliding sleeves and sealing elements. The tool runs into an old wellbore, and the sliding sleeves cut the old passageway from wellbore to formation. During re-fracturing process, the sleeves open by hydraulic pressure, coil tubing, or ball dropping. This allows some of the old perforations connect to wellbore again to allow only that part to be re-fractured. The tool is very expensive. There is high risk that the tool may get stuck in the casing, thus not able to run to the end of the casing. Since the tool must be run in existing casing, the inner diameter of the tool is small, which limits the pumping rate.

Expandable Liner

In this method, a special tool is used to patch the perforated section of a casing (24). This tool first runs a liner with a smaller outer diameter than the inner diameter of the casing. The liner is run to the location of the old perforation cluster, then expand the liner to form a patch in the inside of the casing to seal off the old perforation cluster. This process is repeated until all perforations are patched. Generally, a lot of patches are necessary to seal off all perforation clusters. It is very expensive to patch an entire well. For example, for a well with 30 stages, and 6 clusters per stage, there are 180 patches necessary to patch the entire well. Also, there is a risk of getting the tool stuck during patch operations. As the liner expands, it forces the casing to expand as well and that may damage the cementing behind the casing. This method only seals off the perforations, not the pathways behind the perforations. If a perforation is made somewhere else during re-fracturing, the new perforations may still connect with the old fractures through cementing channels, or complex fracture systems near the wellbore area.

Degradable Particular Diverter

This method uses degradable particles of various sizes to seal off old fractures and then re-fracture the well (25-30). In this method, some proppant and fluid are first pumped into the well. Then the degradable particles are pumped into the well. The particles block perforations that are taking fluid and proppant. Then, fluid and proppant are pumped into the well again. With old perforations blocked, the fluid and proppant would go to perforations which have not been fractured. After certain proppants and fluids are pumped into the newly opened perforations, the degradable particles are pumped into the well again to block these perforations. This process may be cycled many times. These particles degrade after the treatment to allow production. This is the cheapest refrac method and the most popular one so far. However, this method is also very unreliable. It is hard to tell how much degradable particles are needed to seal off the current open perforations because it is very hard to tell how many perforations are open, and how many particles needed to seal off one perforation. If too few are used, the already opened perforations won't be blocked to allow fluid and proppant goes to new perforations. If too many are used, the extra particles left in wellbore could seal off perforations that are newly opened. Also, these particles won't penetrate deep into the existing fracture, thus even if they temporarily blocked currently opened perforations, it can easily fail during a following treatment, allowing fluid and proppant to go into old fractures again.

There is a need for a process to: (1) differentiate the existing perforations that had been fully fractured from those that were not fractured during the first fracturing treatment; (2) reliably seal off the fractured perforations, and confirm that those perforates were indeed sealed off; (3) add more perforations as needed; (4) subsequently re-fracture the perforations that were not fractured during the first fracturing treatment. It is desirable to have a new method that can be applied repeatedly, as needed, during a well's lifetime, so the well can be re-fractured again and again as long as there are still recoverable hydrocarbon left in the reservoir.

SUMMARY OF THE INVENTION

In the present invention, a process is invented to seal off all the existing fractures and perforations in an old well so that the wellbore is ready to be treated again. During this process, it is achievable to differentiate the existing perforations that had been fully fractured from those that were not fractured during the first fracturing treatment. Then, a sealant material is applied to seal off all perforations including the old fractures that had been fully fractured during the prior fracturing treatment. The sealant material is a low viscosity liquid formulation which will undergo crosslinking reaction and form a strong solid material after entering the old fractures and perforations so that those openings are sealed off. Due to the benefit of this liquid formulation with low initial viscosity before crosslinking occurs, the sealant material can penetrate deep into all existing fractures, not only near wellbore area or just perforation holes, which further improve its sealing capability.

After sealing off the old fractures, an optional confirmation step is performed to confirm that those perforates were effectively sealed off.

New perforations can be added as needed. Then, re-fracturing treatment can be applied so that the old perforations that were not fractured during the prior fracturing treatment are fractured, together with any newly added perforations.

This process can be applied repeatedly during a well's lifetime, so the well can be re-fractured for multiple times, which can greatly increase the overall hydrocarbon recovery through the well.

The above process can be applied to several methods, for example:

Method 1

Sealant material, followed by additional diverting agents, are bullheaded into a well that has been fractured. The diverting agents may include solid particles, perforation balls, and similar diverting materials. Once the sealant material is set, the wellbore is cleaned.

Method 2

Use well intervention equipment such as coil tubing, tubing, or drill pipe with a packer at the end. Spot the sealant material into each opening of the existing perforations and fractures. Once the sealant material is set, clean the wellbore. In this method, the existing fractures and perforations are sealed according to the order of their measured depths, from the deepest depth to shallower depth.

Method 3

Run well intervention equipment such as coil tubing, tubing, or drill pipe with a straddle packer. Set the straddle packer to isolate a set of perforation clusters and inject the sealant into the existing perforations and fractures. After all perforations are treated, clean the wellbore. This method is different from method 2 in that since a straddle packer is used, there is no specific order to seal the perforations and fractures.

Method 4

Run well intervention equipment such as coil tubing, tubing, or drill pipe with a straddle packer. Set the straddle packer to isolate a set of perforation clusters. Perform injection testing. If fluid can be injected, then seal this set of perforations with sealant material. If fluid cannot be injected, then break down this set of perforations by increasing pressure to allowed maximum surface pressure. Do this for all existing perforation clusters. After all perforations are treated, clean the wellbore and add more perforations as needed. Bullhead all proppant and diverting materials to re-fracture the whole well.

DETAILED DESCRIPTION OF THE INVENTION

Throughout this application, various references or publications are cited. Disclosures of these references or publications in their entireties are hereby incorporated by reference into this application in order to more fully describe the state of the art to which this invention pertains. It is to be noted that the transitional term "comprising", which is synonymous with "including", "containing" or "characterized by", is inclusive or open-ended and does not exclude additional, unrecited elements or method steps.

As used herein, "Refrac" refers to hydraulic re-fracturing, and means to perform hydraulic fracture on a well that has already been hydraulically fractured before.

The present invention is a process to treat a wellbore that was previously hydraulically fractured so that the well is ready for re-fracture. This process can be achieved using different methods. The methods comprises one or more following steps: (1) differentiating the existing perforations that have been fully fractured from those that have not been fractured previously; (2) reliably sealing off the fractured perforations and confirming that those perforations are indeed sealed; (3) adding more perforations as needed; and (4) re-fracturing the perforations. This process can be repeated as needed during a well's lifetime. For example, an old well can be re-fractured multiple times as long as there is still recoverable hydrocarbons left in its reservoir. This enhances the recovery rate of the well.

Figure 1:
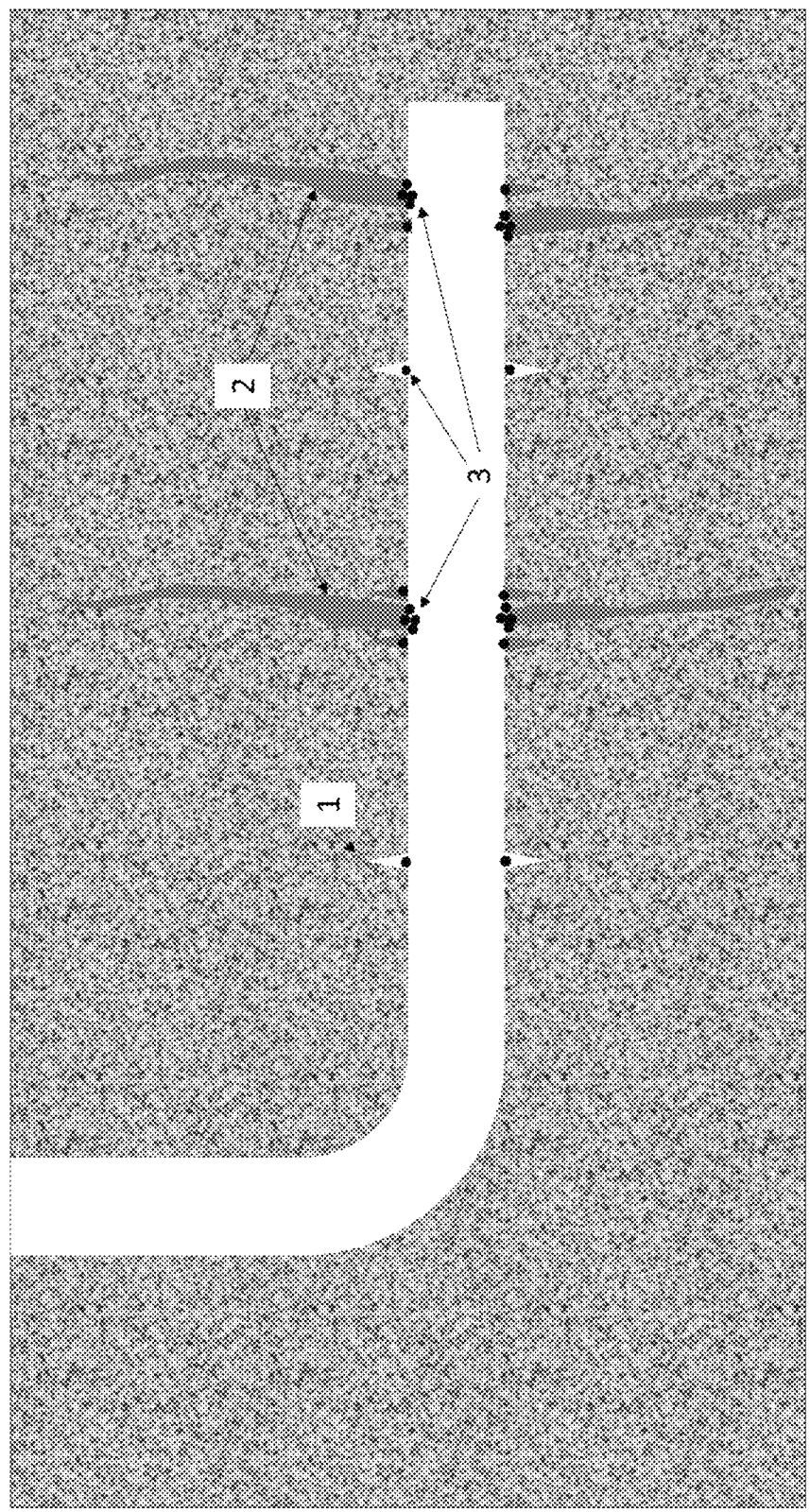
FIG. 1 shows an illustration of Method 1. 1: perforations that were not fractured in the previous hydraulic fracturing treatment; 2: hydraulic fractures that were created in the previous treatment are sealed off by the sealant in this method; 3: diversion particles.

In one embodiment, the process was achieved using method 1, illustrated in FIG. 1. The well has multiple perforations which were not fractured in a previous hydraulic fracturing treatment. The steps are (1) bullheading the sealant material, followed by injecting a diversion agent into the wellbore; The diversion materials can be particles such as 100 mesh sand, or perforation balls that can block the perforations. (2) repeating until no more fluid can be pumped into the wellbore and the maximum allowed surface treating pressure is reached; (3) waiting for the sealant to set; and (4) using well intervention equipment to clean any remaining sealant and diversion material in the wellbore. The result of this method is that the existing fractures created in a previous hydraulic fracturing treatment are now sealed.

Figure 2:
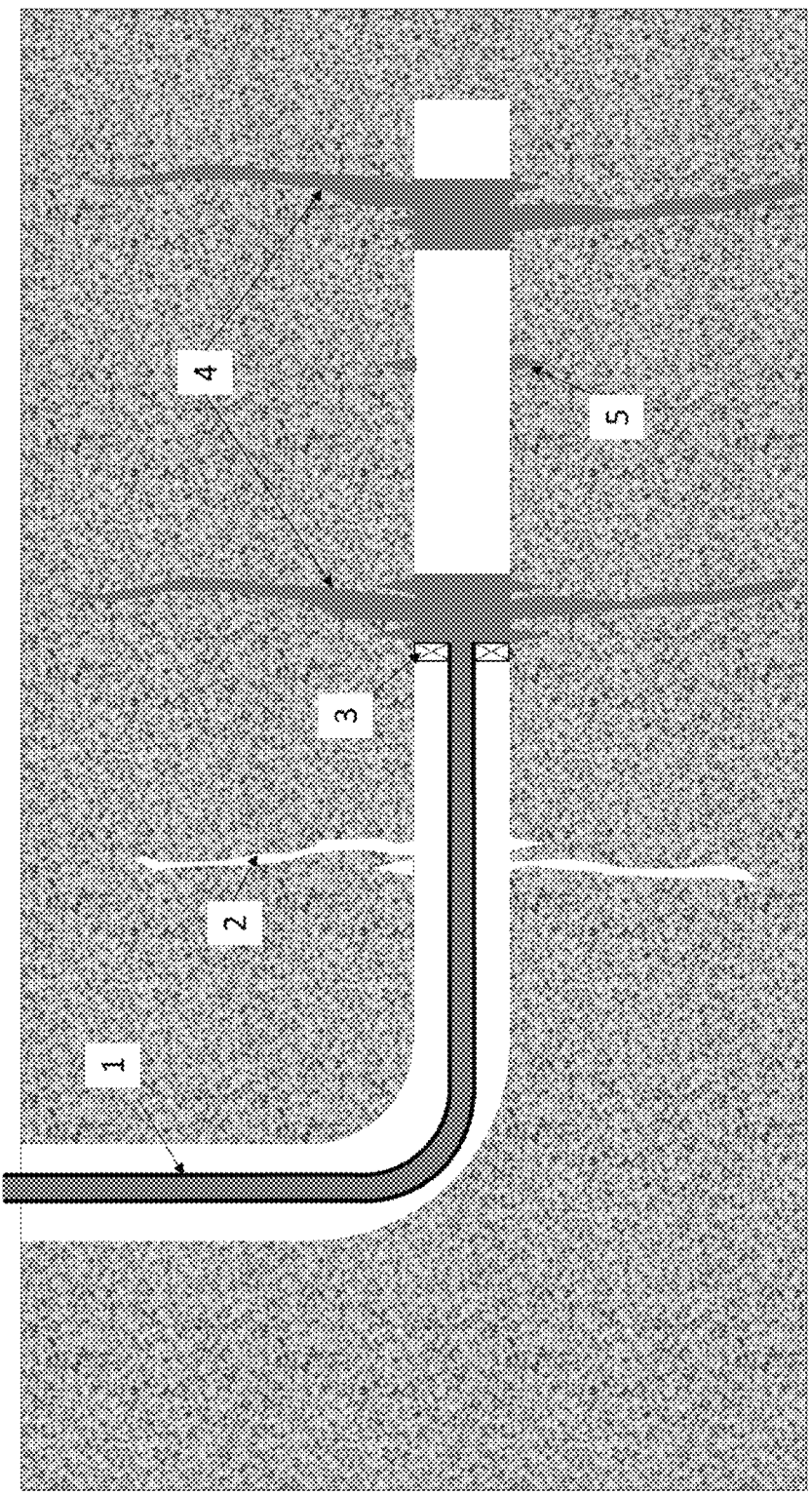
FIG. 2 shows an illustration of Method 2. 1: well intervention such as tubing, drill pipe, or coiled tubing; 2: hydraulic fractures that were created in the previous hydraulic fracturing treatment, which has not been sealed by the sealant yet; 3: packer at the end of the well intervention; 4: fractures that were created in the previous hydraulic fracturing treatment, which are sealed by the sealant; 5: perforations that were not fractured in the previous hydraulic fracturing treatment.

In another embodiment, the process was achieved using method 2, illustrated in FIG. 2. In this method, it is necessary to differentiate perforations that had been fractured in previous fracture treatment. This differentiation is performed through the following steps: (1) running in a wellbore with well intervention equipment such as coil tubing, tubing, or drill pipes; (2) using a retrievable packer at the end of the well intervention equipment; (3) running the packer to a depth where some existing perforations to be treated are below the depth; (4) setting the packer and performing injection tests by injecting fluid into the formation and monitoring injection pressure; and (5) making a judgment of whether the perforations have been previously fully fractured based on the injection pressure data.

In method 2, if the perforations are fully fractured from a previous fracturing treatment, they may be sealed with multiple cycles of sealing material and diversion agents until a certain surface pumping pressure is achieved. The steps includes: (1) pumping in sealing material, tailed in with diversion agent until a certain surface pumping pressure is reached. This pumping can comprise of multiple sealant/diverter/water displacement cycles; (2) releasing the packer and pumping fluid to clean the well intervention equipment; and (3) pulling out the well intervention equipment to a shallower depth. The differentiating and sealing processes can be repeated as necessary at different depths.

In method 2, if the perforations were not fully fractured, the sealing process is done through the following steps: (1) the packer is released to allow some sealant material be circulated to the perforation. (2) set packer to squeeze some sealant into the perforation by applying certain surface pumping pressure. (3) The packer is released and pulled to a shallower measured depth, where the differentiating process can be repeated.

Once all existing perforations are tested and/or sealed, the intervention equipment can be pulled out of the wellbore. After the sealant is set, the well intervention equipment are used to clean any sealant material left in the wellbore. The resulting of method 2 is that the existing perforations and fractures created in a previous hydraulic fracturing treatment are now sealed.

Figure 3:
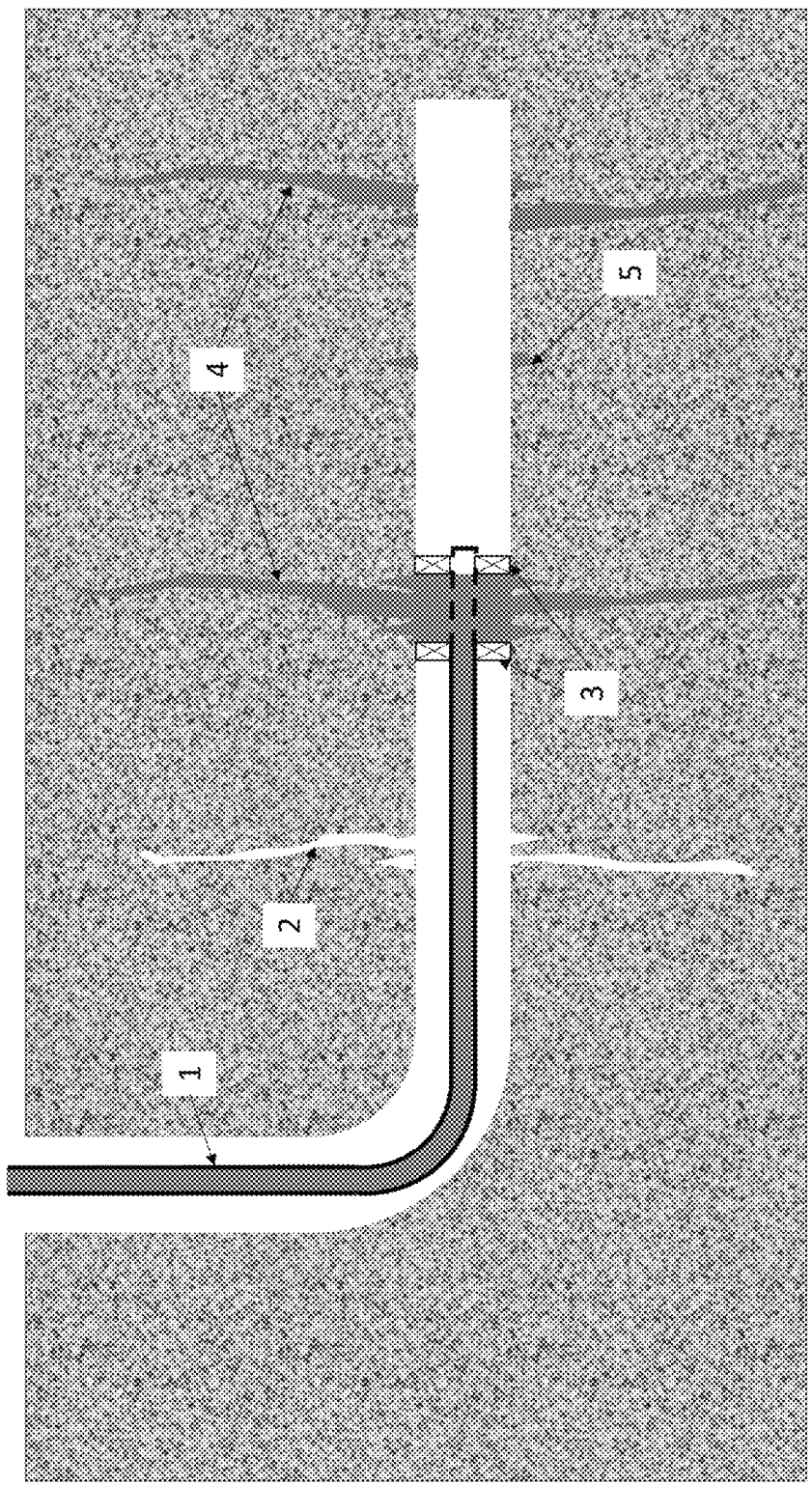
FIG. 3 shows an illustration of Method 3. 1: well intervention such as tubing, drill pipe, or coiled tubing; 2: hydraulic fractures that were created in the previous hydraulic fracturing treatment, which has not been sealed by the sealant yet; 3: straddle packer at the end of the well intervention; 4: fractures that were created in the previous hydraulic fracturing treatment, which are sealed by the sealant; 5: perforations that were not fractured in the previous hydraulic fracturing treatment.

In another embodiment, the process was achieved using method 3, illustrated in FIG. 3. In this method, the differentiating and sealing processes is achieved by using a straddle packer instead of packer. The differentiating process comprises multiple steps, including: (1) running in a wellbore with well intervention equipment such as coil tubing, tubing, or drill pipes; using a straddle packer at the end of the well intervention equipment; (2) setting the straddle packer across several perforation holes and performing injection tests by injecting fluid into the formation and monitoring injection pressures; and (3) making a judgment of whether the perforations have been previously fully fractured based on the injection pressure data.

In method 3, if the perforations are fully fractured from a previous fracturing treatment, they may be sealed with a sealing process comprising multiple steps, including: (1) pumping in sealing material with or without diversion agent until a certain surface pumping pressure is achieved. This pumping can comprise of multiple sealant/diverter/water displacement cycles; (2) releasing the straddle packer and pumping fluid to clean the well intervention equipment; and (3) trip the straddle packer to a different depth, where the differentiating process can be repeated.

In method 3, if injection test shows that the existing perforation are not fully fractured, perform these steps: (1) packer is released; (2) a small volume of sealant material is circulated to the perforation depth; (3) set packer; (4) the sealant material is squeezed in the perforation by applying a certain allowable surface pressure; (5) release the packer; (6) trip the straddle packer to another depth, where the differentiating process can be repeated.

Once some or all perforations are tested and/or sealed, the intervention equipment can be pulled out of the wellbore. After the sealant is set, the well intervention equipment are used to clean any sealant material left in the wellbore. When method 3 is applied, the operator has the choice to leave certain existing perforations and fractures not to be sealed, so that these perforations and fractures are ready for refrac treatment. That is a major difference from method 2.

Figure 4:
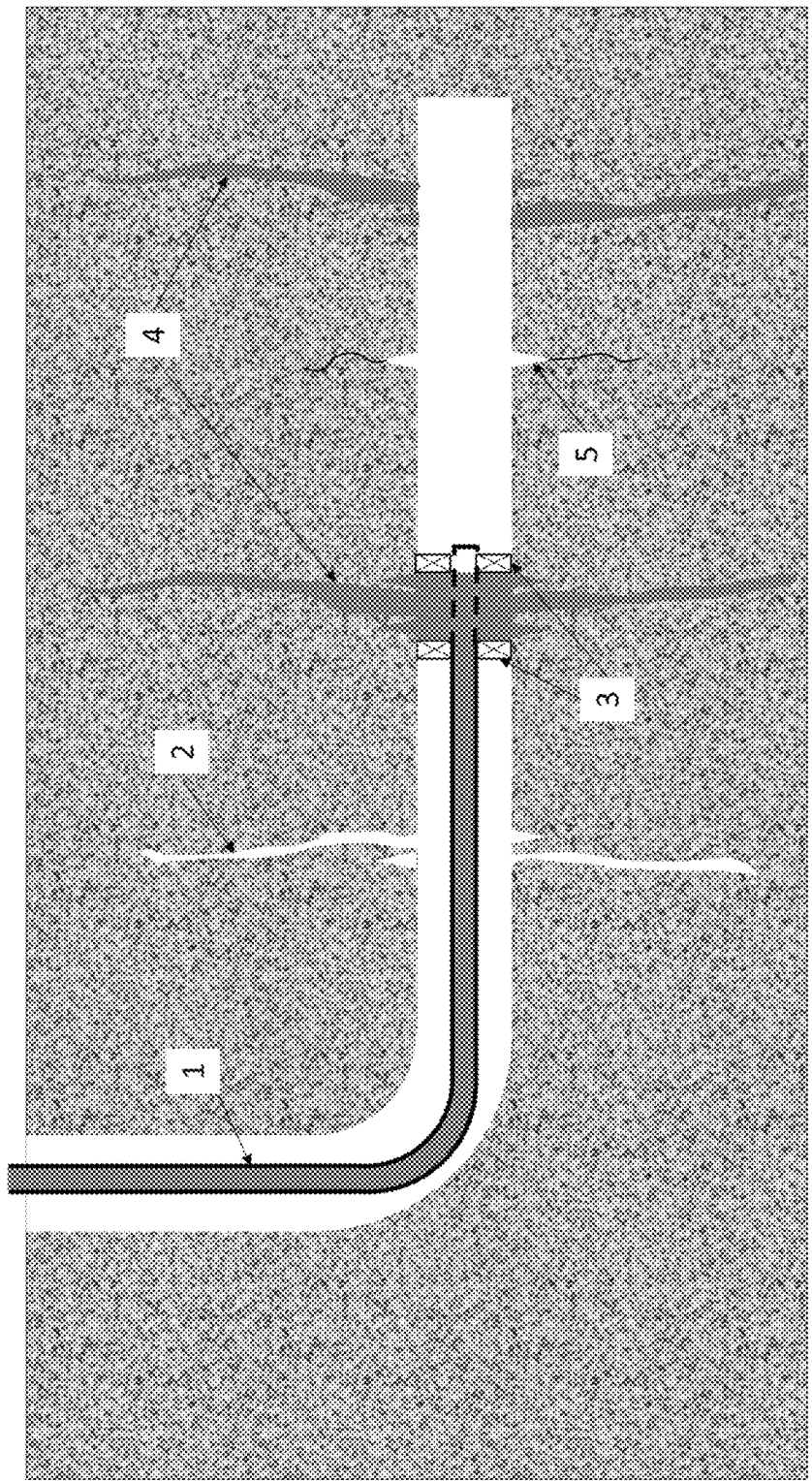
FIG. 4 shows an illustration of Method 4. 1: well intervention such as tubing, drill pipe, or coiled tubing; 2: hydraulic fractures that were created in the previous hydraulic fracturing treatment, which has not been sealed by the sealant yet; 3: straddle packer at the end of the well intervention; 4: fractures that were created in the previous hydraulic fracturing treatment, which are sealed by the sealant; 5: perforations that were not fractured in the previous hydraulic fracturing treatment, are broken down by this method for subsequent refracturing treatment.
Figure 5:
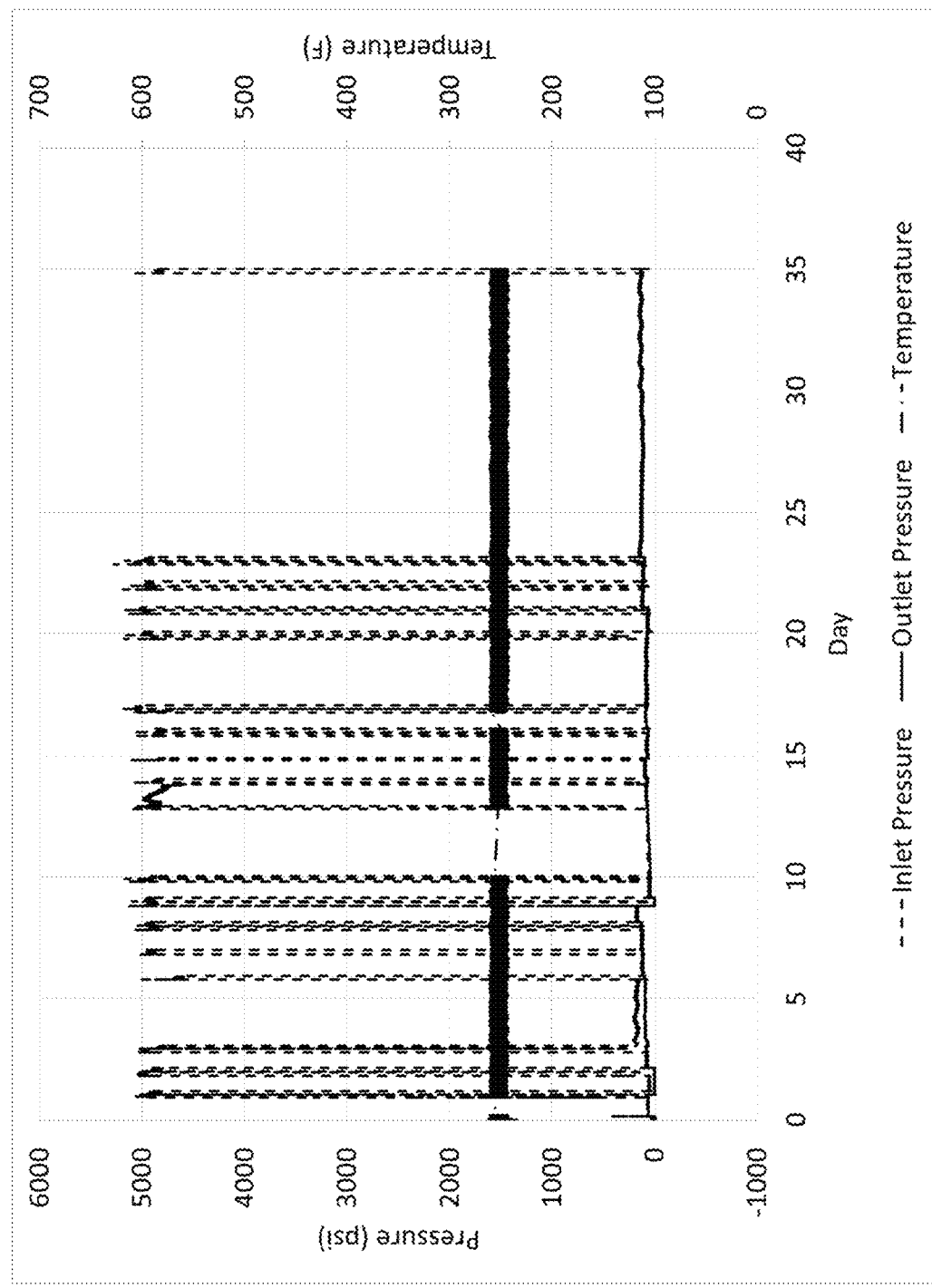
FIG. 5 shows the experiment result using a fit to purpose instrument. In this experiment, a sealant material is filled with a one-foot-long, 0.532 in ID stainless steel tubing. This tubing is heated to 250° F. for 20 hours. Then 5000 psi was put at the inlet of the tubing, hold for 2 to 20 hours, then released after 2 to 20 hours. The experiment lasted 35 days. During these days, this pressure-up, pressure-down process was repeated multiple times to simulating the cyclical differential pressure the sealant material would underwent during refrac process. In the whole process, temperature was maintained at 250° F. The pressure at inlet (dashed line) and outlet of the tubing (solid line), and temperature (blud dash-dotted line) were recorded throughout the experiment. The outlet pressure was close to 0 psi all the time, proving that the sealant in the tubing can hold 5000 psi differential pressure at 250° F. while underwent cyclic pressure loading for 35 days. Thus the material can act as sealant material at downhole conditions.
Figure 6:
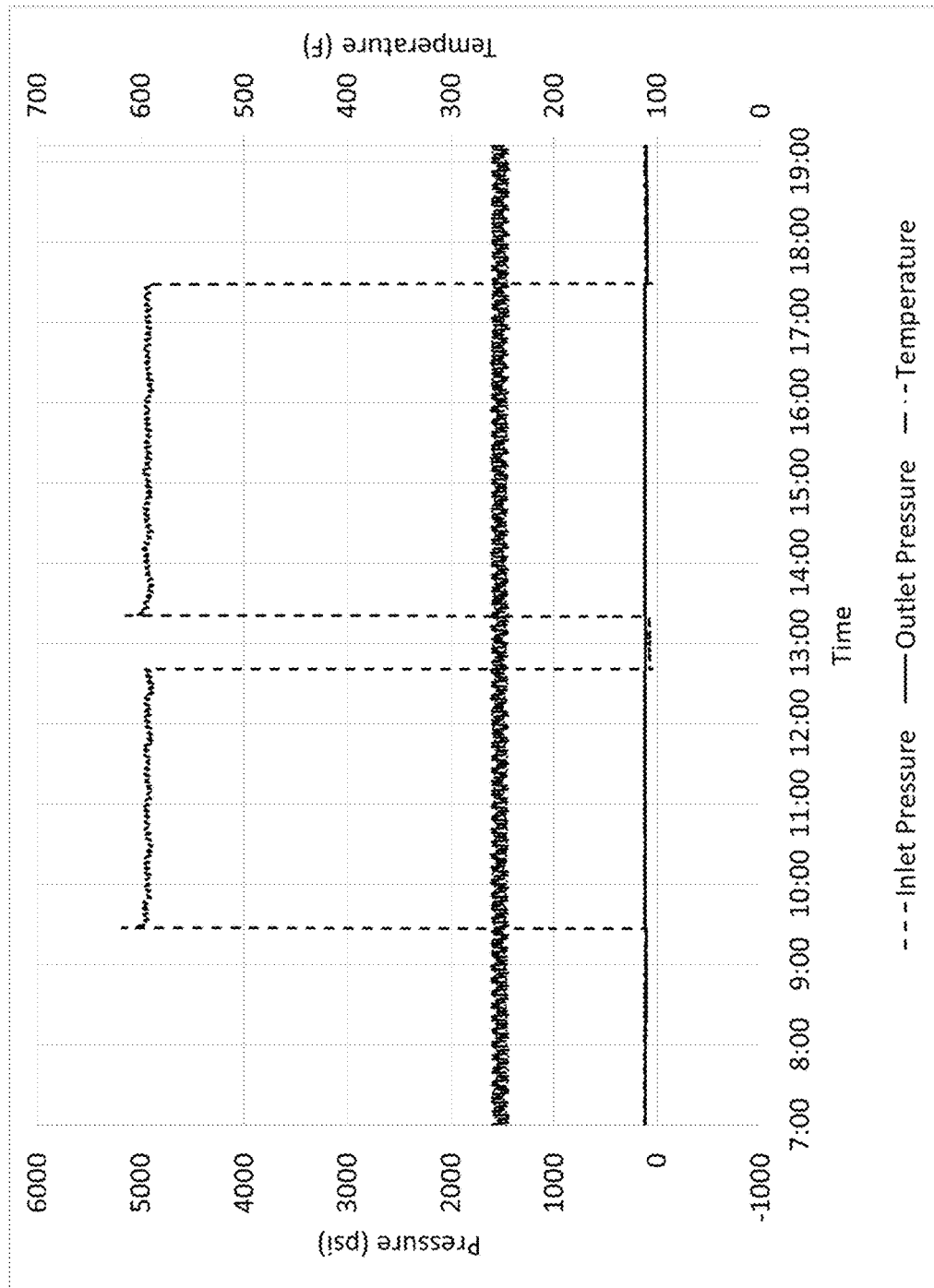
FIG. 6 is a zoomed section of FIG. 5 to reveal more details of the experiment result.
Figure 7:
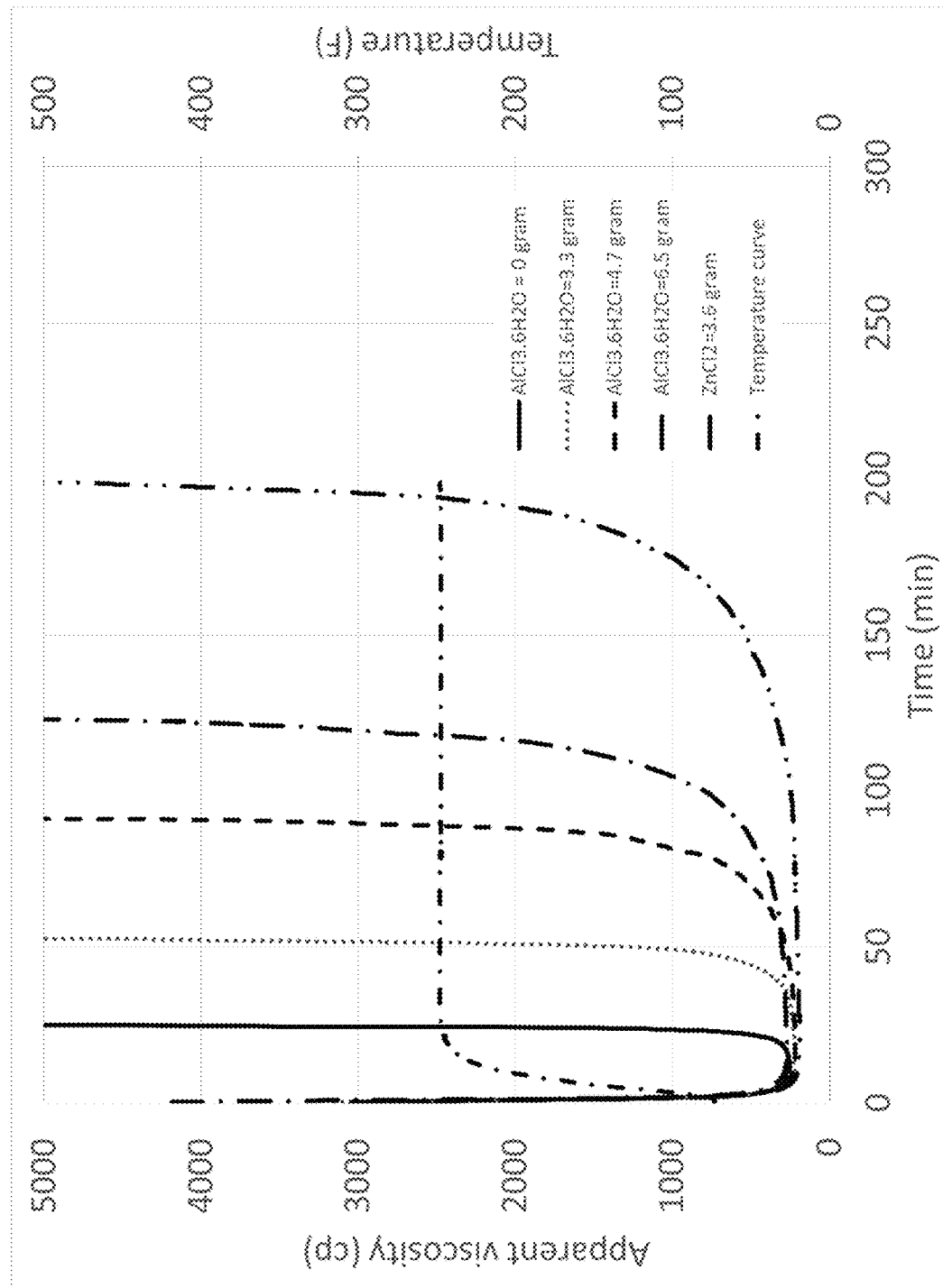
FIG. 7 shows that $AlCl_3$ and $ZnCl_2$ are used as retarders to adjust the starting time of the crosslinking reaction. In this set of experiments, the concentration of the polymer and crosslinker remain the same for all tests. Various concentrations of $AlCl_3$ are evaluated. All tests were performed at 250° F. As the concentration of $AlCl_3$ increases, the initiation of crosslink reaction are further delayed.

In another embodiment, the process was achieved using method 4, illustrated in FIG. 4. In this method, the differentiating and sealing processes is also achieved by using a straddle packer. The differentiating process comprises multiple steps, including: (1) running in a wellbore with will intervention equipment such as coil tubing, tubing, or drill pipes; using a straddle packer at the end of the well intervention equipment; (2) setting the straddle packer across several perforation holes and performing injection tests by injecting fluid into the formation and monitoring injection pressures; and (3) making a judgment of whether the perforations have been previously fully fractured based on the injection pressure data.

In method 4, if the perforations are fully fractured from a previous fracturing treatment, they may be sealed with a sealing process comprising multiple steps, including: (1) pumping in sealing material with or without diversion agent until a certain surface pumping pressure is achieved. This pumping can comprise of multiple sealant/diverter/water displacement cycles; (2) releasing the straddle packer and pumping fluid to clean the well intervention equipment; and (3) trip the straddle packer to a different depth, where the differentiating process can be repeated.

In method 4, if injection test shows that the existing perforation are not fully fractured, perform these steps: (1) apply certain pressure to break down the formation; (2) release the packer; (3) trip the straddle packer to another depth, where the differentiating process can be repeated.

Once some or all perforations are tested and/or sealed, the intervention equipment can be pulled out of the wellbore. After the sealant is set, the well intervention equipment are used to clean any sealant material left in the wellbore. When method 4 is applied, the operator has the choice to seal off existing fracture, and break down perforations that were not fractured, so that these perforations have better chance to be refractured. That is a major difference from method 3.

After any of the above methods, or the combination of the above methods are applied to a well, new perforations can be added. The well can then be re-fractured by using suitable hydraulic fracturing methods, such as bullhead treatment, bullhead with diversion, plug-and-perf method, fracturing with coil tubing, sliding and sleeve.

The sealant system of the present invention comprises at least one crosslinkable polymer and at least one crosslinking agent/crosslinker. When needed, a crosslinking rate modifier can be added into the system in order to increase or decrease the overall crosslinking time. Solid particles can also be added into the system as filler and/or diverter.

In one embodiment, the crosslinkable polymer can be polyacrylamide, polyacrylic acid, polyacrylate salt, polyacrylate ester, polyamine, polyalkyleneimine, or copolymer of these polymers. In addition, the cross-linking functionality can be sterically hindered or configured as a retarding agent. Specifically, the crosslinkable polymers can be selected from, but not limited to, the following: polyacrylamide, polyacrylic acid, polymethylacrylate, acrylamide/t-butyl acrylate copolymer, alkyl acrylate polymer, 2-acrylamido-2-methylpropane sulfonic acid/acrylamide copolymers, sulfonated styrene/maleic anhydride copolymers, vinylpyrrolidone/2-acrylamido-2 methylpropane sulfonic acid/acrylamide terpolymers, 2-acrylamido-2-methylpropane sulfonic acid/N-N-dimethy lacrylamide/acrylamide terpolymers, polyethylenimine, dimethylaminoethyl methacrylate, dimethylaminopropyl methacrylamide, or quaternized dimethylaminoethyl methacrylate. The crosslinkable polymers can also be any combination and in any proportion of these compounds.

In one embodiment, the crosslinker can be monomer, polymer, copolymer and mixtures of amine, imine, vinyl amine or their derivatives. In another embodiment, the crosslinking agent, which comprises amine or imine group capable of crosslinking a polymer comprising carbonyl groups, can be diamine, triamine, tetraamine, pentaamine, other polyamine, or any combination thereof. For example, the crosslinking agent, which comprises an amine group capable of crosslinking a polymer comprising carbonyl groups, can be a polyalkyleneimine, a polyethyleneimine, a polyalkylenepolyamine, a polyfunctional aliphatic amine, an arylalkylamine, a heteroarylalkylamine, or any combination thereof.

In other embodiment, the crosslinking agent, which comprises a carboxylic acid group capable of crosslinking a polymer comprising amine or imine groups, can be dicarboxylic acid, tricarboxylic acid, tetracarboxylic acid, pentacarboxylic acid, other polycarboxylic acids, their salts, their derivatives, or any combination thereof. Some examples of these crosslinking agents include, but not limited to: oxalic acid, malonic acid, succinic acid, glutaric acid, adipic acid, pimelic acid, suberic acid, azelaic acid, sebacic acid, citric acid, isocitric acid, aconitic acid, propane-1,2,3-tricarboxylic acid, trimesic acid, nitrilotriacetic acid, ethylenediaminetetraacetic acid, their salts, or any mixture of them.

The crosslinking time of the system can be modified by using protonic acid and/or Lewis acid. Protonic acid such as hydrochloric acid, sulfuric acid, phosphoric acid, acetic acid, acetoacetic acid, citric acid can be used to delay the crosslinking time. Similarly, Lewis acid including aluminum chloride, zinc chloride, copper chloride, copper sulfate, iron trichloride, or other transition metal salt can also be used in order to delay the crosslinking time at elevated temperature.

It was also found that bases can be used to modify the crosslinking reaction rate. For example, bases and Lewis bases, such as NaOH, KOH, ammonia, hydrazine, pyridine etc. can be used to modify the crosslinking reaction rate.

In one embodiment, the present invention provides a method of re-fracturing a wellbore, comprising the steps of: (a) identifying perforations that have been fully fractured; (b) applying a chemical sealant composition to seal off fully fractured perforations identified in (a), said sealant composition comprises low viscosity liquid formulation that undergoes crosslinking reaction to forms a strong solid material after entering said fractured perforations; and (c) performing re-fracturing to perforations that are not sealed. In one embodiment, the re-fracturing is done at, above or below a region where previously fractured perforations are located.

In one embodiment, the sealant composition comprises at least one crosslinkable polymer or copolymer and at least one crosslinking agent. For example, the crosslinkable polymer or copolymer can be polyacrylamide, polyacrylic acid, polyacrylate salt, polyacrylate ester, polyamine, polyalkyleneimine, and combinations thereof. polymethylacrylate, acrylamide/t-butyl acrylate copolymer, 2-acrylamido-2-methylpropane sulfonic acid/acrylamide copolymers, sulfonated styrene/maleic anhydride copolymers, vinylpyrrolidone/2-acrylamido-2 methylpropane sulfonic acid/ acrylamide terpolymers, 2-acrylamido-2-methylpropane sulfonic acid/N-N-dimethy lacrylamide/acrylamide terpolymers, polyethylenimine, dimethylaminoethyl methacrylate, dimethylaminopropyl methacrylamide, or quaternized dimethylaminoethyl methacrylate, and combinations thereof.

In one embodiment, the crosslinking agent comprises an amine or imine group capable of crosslinking a polymer comprising carbonyl groups. The crosslinking agent can be diamine, triamine, tetraamine, pentaamine, other polyamine, polyalkyleneimine, polyethyleneimine, polyalkylenepolyamine, polyfunctional aliphatic amine, arylalkylamine, heteroarylalkylamine, and combinations thereof.

In another embodiment, the crosslinking agent comprises a carboxylic acid group capable of crosslinking a polymer comprising amine or imine groups. The crosslinking agent can dicarboxylic acid, tricarboxylic acid, tetracarboxylic acid, pentacarboxylic acid, other polycarboxylic acids, oxalic acid, malonic acid, succinic acid, glutaric acid, adipic acid, pimelic acid, suberic acid, azelaic acid, sebacic acid, citric acid, isocitric acid, aconitic acid, propane-1,2,3-tricarboxylic acid, trimesic acid, nitrilotriacetic acid, ethylenediaminetetraacetic acid, their salts or derivatives thereof, and combinations thereof.

In one embodiment, the crosslinking agent is degradable over time, thereby making the sealant composition degradable.

In one embodiment, the crosslinking reaction is further controlled by a pH agent comprising protonic acid, Lewis acid, base, or Lewis base. In one embodiment, the pH agent can be hydrochloric acid, sulfuric acid, phosphoric acid, acetic acid, acetoacetic acid, or citric acid. In another embodiment, the pH agent can be aluminum chloride, zinc chloride, copper chloride, copper sulfate, or iron trichloride. In yet another embodiment, the pH agent can be NaOH, KOH, ammonia, hydrazine, or pyridine.

In one embodiment, the sealant composition further comprises a degradable or non-degradable particulate diversion material.

In one embodiment, the method of the present invention comprises injecting the sealant composition into perforations and fully fractured perforations are identified based on injection pressure data. In one embodiment, the re-fracturing comprises bullhead treatment, bullhead with diversion, plug-and-perf method, fracture with coil tubing, sliding or sleeve.

The invention being generally described, will be more readily understood by reference to the following examples which are included merely for purposes of illustration of certain aspects and embodiments of the present invention, and are not intended to limit the invention.

EXAMPLE 1

Polyacrylamide with an average molecular weight less than about 100,000 Da. was purchased from Polysciences Inc. Crosslinkers include Ethylenediamine, Hexamethylenediamine, Hexamethylenetetramine, and Polyethylenimine (molecular weight less than 100,000) were purchased from Sigma-Aldrich. Polyacrylamide and various crosslinkers were mixed in glass beaker according to the ratio below and stirred well with glass bar. After the components were fully mixed, the glass vials were tightly capped and heat to 95° C. in an oven over night. The samples were inspected next day. In all experiments listed below, the initial liquid samples transformed into strong crosslinked gel.

| Experiment # | Composition 1 | Composition 2 |
|---|---|---|
| 1 | Polyacrylamide, 50% (w/w) solution, 3 ml | Ethylenediamine, liquid, 1 ml |
| 2 | Polyacrylamide, 50% (w/w) solution, 3 ml | Hexamethylenediamine, 70% water solution, 2.5 ml |
| 3 | Polyacrylamide, 50% (w/w) solution, 5 grams | Hexamethylenetetramine, 1 gram |
| 4 | Polyacrylamide, 50% (w/w) solution, 3 ml | Polyethylenimine (PEI), 50% (w/w) solution, 1.2 ml |

EXAMPLE 2

Polyacrylic acid with an average molecular weight less than about 400,000 Da. was purchased from Sigma-Aldrich. The powder was weighed and mixed with water to prepare a 40% (w/w) aqueous solution. Polyethylenimine (molecular weight less than 100,000) was purchased from Sigma-Aldrich. Polyacrylic acid and polyehylenimine were mixed in glass vial according to the composition below and stirred well with glass bar. After the components were fully mixed, the vials were tightly capped and stored at 110° C. in an oven over night. The samples were inspected next day. All initial liquid samples transformed into strong crosslinked gels.

| Experiment # | Composition 1 | Composition 2 |
|---|---|---|
| 5 | Polyacrylic acid, 40% (w/w), 4 ml | Polyethylenimine (PEI), 50% (w/w), 2 ml |

EXAMPLE 3

Polymethylacrylate (molecular weight less than 400,000), ethylenediamine, and hexamethylenediamine were purchased from Sigma-Aldrich. Polymethylacrylate was mixed with either ethylenediamine or hexamethylenediamine in glass vials according to the compositions below and stirred well with glass bar. After the components were fully mixed, the glass vials were tightly capped and stored at 105° C. in an oven over night. The samples were inspected next day. All initial liquid samples transformed to crosslinked gels.

| Experiment # | Composition 1 | Composition 2 |
|---|---|---|
| 6 | polymethylacrylate, 40% solution in toluene, 4 ml | Ethylenediamine, liquid, 0.5 ml |
| 7 | polymethylacrylate, 40% solution in toluene, 4 ml | Hexamethylenediamine, 1.75 gram |

EXAMPLE 4

Polyethylenimine (molecular weight less than 100,000), succinic acid, and citric acid were purchased from Sigma-Aldrich. Polyethylenimine and succinic acid or citric acid were mixed with each other in glass vials according to the compositions below and stirred well with glass bar. After the components were fully mixed, the glass vials were tightly capped and stored at 115° C. in an oven over night. The samples were inspected next day. All initial liquid samples transformed to crosslinked gels.

| Experiment # | Composition 1 | Composition 2 |
|---|---|---|
| 8 | Polyethylenimine (PEI), 50% (w/w) solution, 4 ml | Succinic acid, 2.5 gram |
| 9 | Polyethylenimine (PEI), 50% (w/w) solution, 4 ml | Citric acid, 3.9 gram |

EXAMPLE 5

Polyacrylamide (molecular weight less than about 100,000) was purchased from Polysciences Inc. Hexamethylenediamine was purchased from Sigma-Aldrich. Hexamethylenediamine was dissolved in water to prepare 70% (w/w) solution. Polyacrylamide and hexamethylenediamine water solution were mixed in glass beaker according to the composition below. The sample was stirred well with glass bar.

| Experiment # | Composition 1 | Composition 2 |
|---|---|---|
| 10 | Polyacrylamide, 50% (w/w) solution, 30 ml | Hexamethylenediamine, 70% (w/w) solution, 25 ml |

A fit for purpose laboratory apparatus has been designed and built to measure how much differential pressure the crosslinked material can hold after it is placed in-situ. In the fit for purpose test apparatus, there is a tubular reactor that is 1 foot long and has 0.532 inch inner diameter. Firstly, 16.5 gram of 20/40 proppant was transferred into the tubular reactor, then liquid mixture mentioned above was filled into the tubular reactor. The tubular reactor was connected to the apparatus. The tubular reactor was heated to 250° F. for overnight. Then the pressure to the inlet of the tubular reactor was increased to 5000 psi, while the pressure at the outlet of the tubular reactor was monitored. Temperature, as well as the inlet and outlet pressures were recorded accordingly. The pressure of the inlet was hold at 5000 psi for about 3 hours, then pressure was released. After a waiting time (usually 1 to 12 hours), the inlet pressure was increased again and the experiment was repeated. This experiment with pressure cycle was repeated for 30 days. During this period, the temperature was maintained at 250° F.

Experiments result indicate that our novel compositions have the ability to hold a 5,000 psi differential pressure at temperature of 250° F. for over 30 days. Moreover, in the cyclic test, the material underwent 30 days without breaking down nor incurring a pressure loss. This result indicate that our formulation is stable and strong enough to take the rigors of a multi stage frac completion (see FIG. 6 and FIG. 7).

EXAMPLE 6

Figure 8:
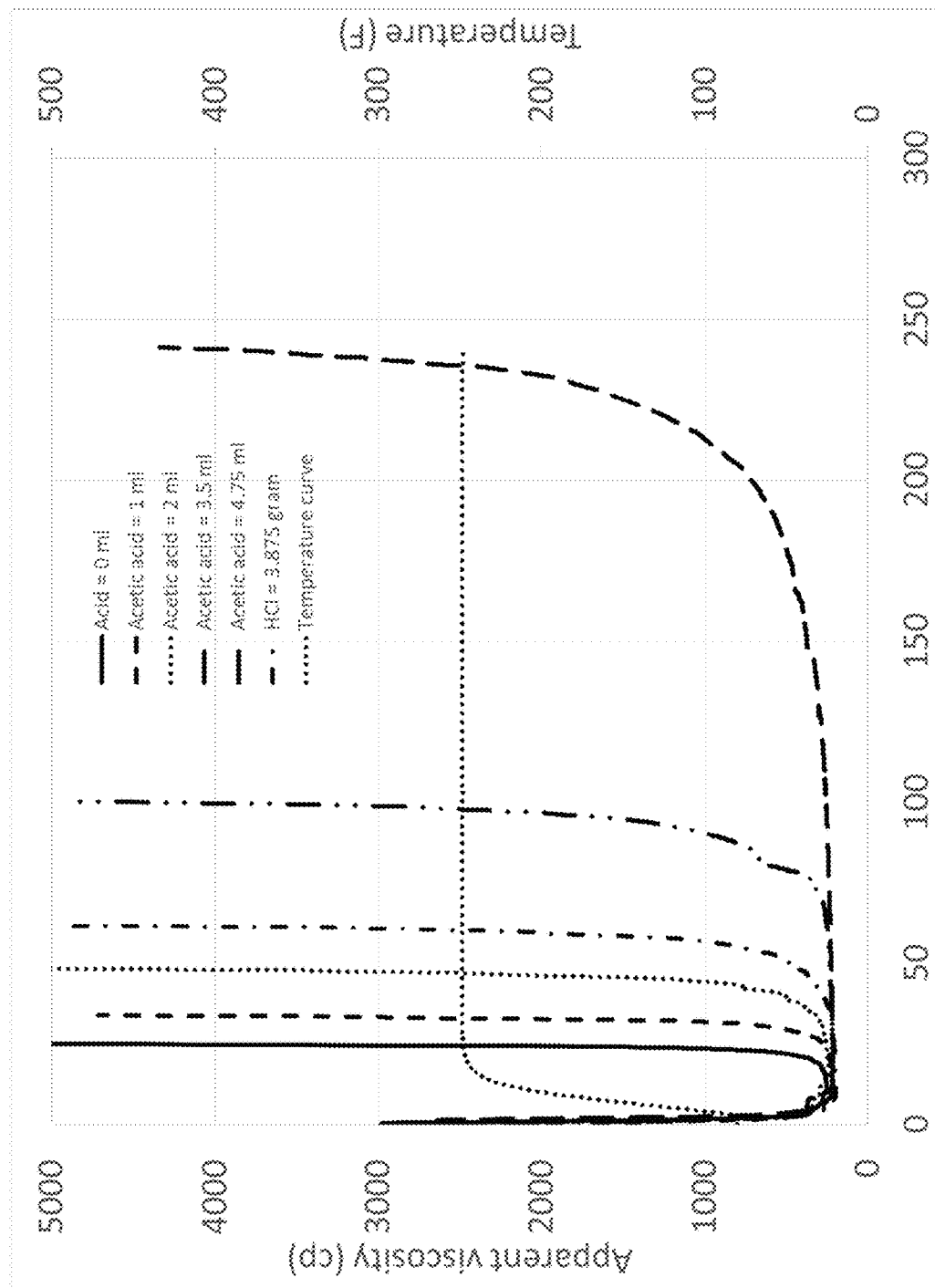
FIG. 8 shows that hydrochloric acid and acetic acid are used as retarders to adjust the starting time of the crosslinking reaction. In this set of experiments, the concentration of the polymer and crosslinker remain the same for all tests. Various concentrations of acetic acid are evaluated. All tests were performed at 250° F. As the concentration of acetic acid increases, the initiation of crosslink reaction are further delayed.

In this set of experiments. The crosslinking rate was modified using $AlCl_3 \cdot 6H_2O$ or $ZnCl_2$. The polyacrylamide (molecular weight less than about 100,000) was purchased from Polysciences Inc. Hexamethylenediamine was purchased from Sigma-Aldrich. A 70% (w/w) aqueous solution of Hexamethylenediamine was prepared. $AlCl_3 \cdot 6H_2O$ was purchased from Consolidated Chemical. The three compositions were mixed together. The mixture was transferred into the sample cup of the Chandler 5550 rheometer. The cup was pressured to 100 psi with nitrogen gas, then the cup was heat to 250° F. The apparent viscosity was measured at 15 $s^{-1}$. Measurement was stopped once abrupt viscosity increase was observed. The results showed that transition metal salts which functions as the Lewis acid, such as $AlCl_3$ and $ZnCl_2$ can be used to modify the crosslinking reaction rate. (FIG. 8)

| Experiment # | Polyacrylamide, 50% (w/w) solution, gram | Hexamethylenediamine, 70% (w/w) solution, gram | $AlCl_3 \cdot 6H_2O$, gram | $ZnCl_2$ gram |
|---|---|---|---|---|
| 11 | 90 | 14.8 | 0 | |
| 12 | 90 | 14.8 | 3.3 | |
| 13 | 90 | 14.8 | 4.7 | |
| 14 | 90 | 14.8 | 6.5 | |
| 15 | 90 | 14.8 | | 3.6 |

EXAMPLE 7

Figure 9:
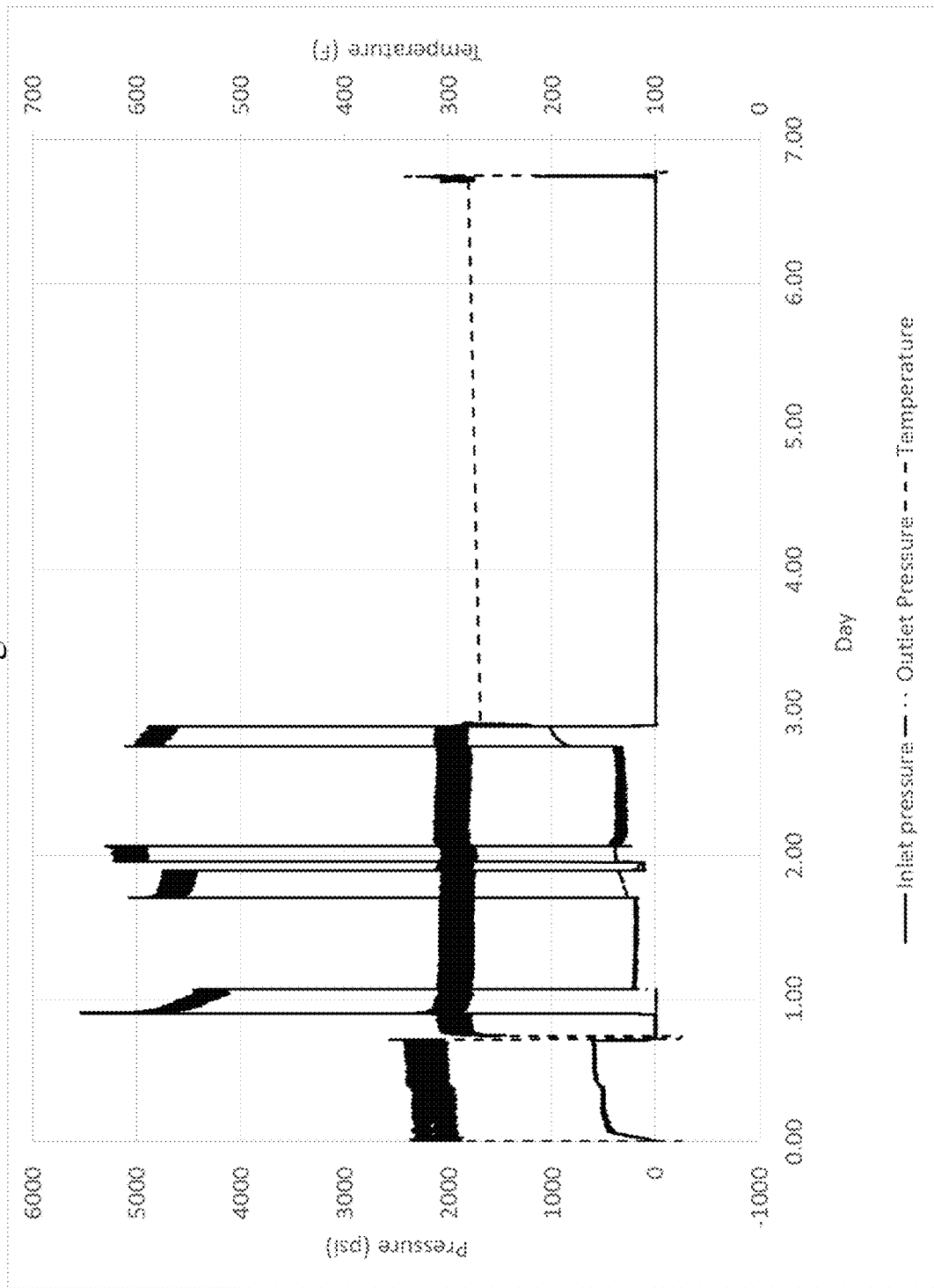
FIG. 9 shows the result of a degradation experiment. In this experiment, a one-foot-long, 0.532 in ID stainless steel tubing is filled with a sealant material. This tubing is heated to 300° F. for about 16 hours. Then pressure was applied to the inlet of the tubing to test how much differential pressure the material can sustain over a certain period of time. This experiment demonstrate that the sealing material is degradable over time.

In this set of experiments. The crosslinking reaction rate was modified using acetic acid and hydrochloric acid. The polyacrylamide (molecular weight less than about 100,000) was purchased from Polysciences Inc. It was prepared as 50% (w/w) aqueous solution. Hexamethylenediamine, glacial acetic acid, and hydrochloric acid (37% w/w in water) were purchased from Sigma-Aldrich. Hexamethylenediamine was mixed with water to prepare 70% (w/w) aqueous solution. The chemicals were mixed together as listed in the table below. The mixture was loaded into in the sample cup of the Chandler model 5550 rheometer. After the cup was pressured to 100 psi with nitrogen gas, the cup was heated to 250° F. The apparent viscosity was then measured at 15 $s^{-1}$. Measurement was stopped once abrupt viscosity increase was observed. The results showed that protonic acids such as acetic acid and hydrochloric acid can be used to modify the crosslinking reaction rate. (FIG. 9)

| Experiment # | Polyacrylamide, 50% (w/w) solution, gram | Hexa-methylenediamine, 70% (w/w) solution, gram | Acetic acid, ml | HCl, 37% (w/w), gram |
|---|---|---|---|---|
| 11 | 90 | 14.8 | 0 | 0 |
| 16 | 90 | 14.8 | 1 | 0 |
| 17 | 90 | 14.8 | 2 | 0 |
| 18 | 90 | 14.8 | 3.5 | 0 |
| 19 | 90 | 14.8 | 4.75 | 0 |
| 20 | 90 | 14.8 | 0 | 3.875 |

EXAMPLE 8

Polyacrylamide (molecular weight less than about 100,000) was purchased from Polysciences Inc. Hexamethylenetetramine was purchased from Sigma-Aldrich. Polyacrylamide and hexamethylenetetramine were mixed well using a glass rod in a beaker, according to the composition ratio listed below.

| Experiment # | Composition 1 | Composition 2 |
|---|---|---|
| 21 | Polyacrylamide, 50% (w/w) solution, 50 gram | Hexamethylenetetramine, 7 gram |

A fit for purpose laboratory apparatus has been designed and built to investigate the potential degradation of the sealing material at elevated temperature over time. In the fit for purpose test apparatus, there is a tubular reactor that is 1 foot long and has an inner diameter of 0.532 inch. During the experiment, 16.5 gram of 20/40 proppant was transferred into the tubular reactor, then liquid composition mixture mentioned above was filled into the tubular reactor. The tubular reactor was connected to the apparatus. The tubular reactor was heated to 300° F. for overnight. Then pressure was applied to the inlet of the tubing to test how much differential pressure the material can sustain over a certain period of time. If the sealing material started to degrade over time, it could no longer hold differential pressure and a change of pressure could be observed at the outlet end. Temperature, as well as the inlet and outlet pressures were recorded accordingly. This experiment was on-going for 7 days until the material could no longer hold differential pressure. During this period, the temperature was maintained at 300° F.

Figure 10:
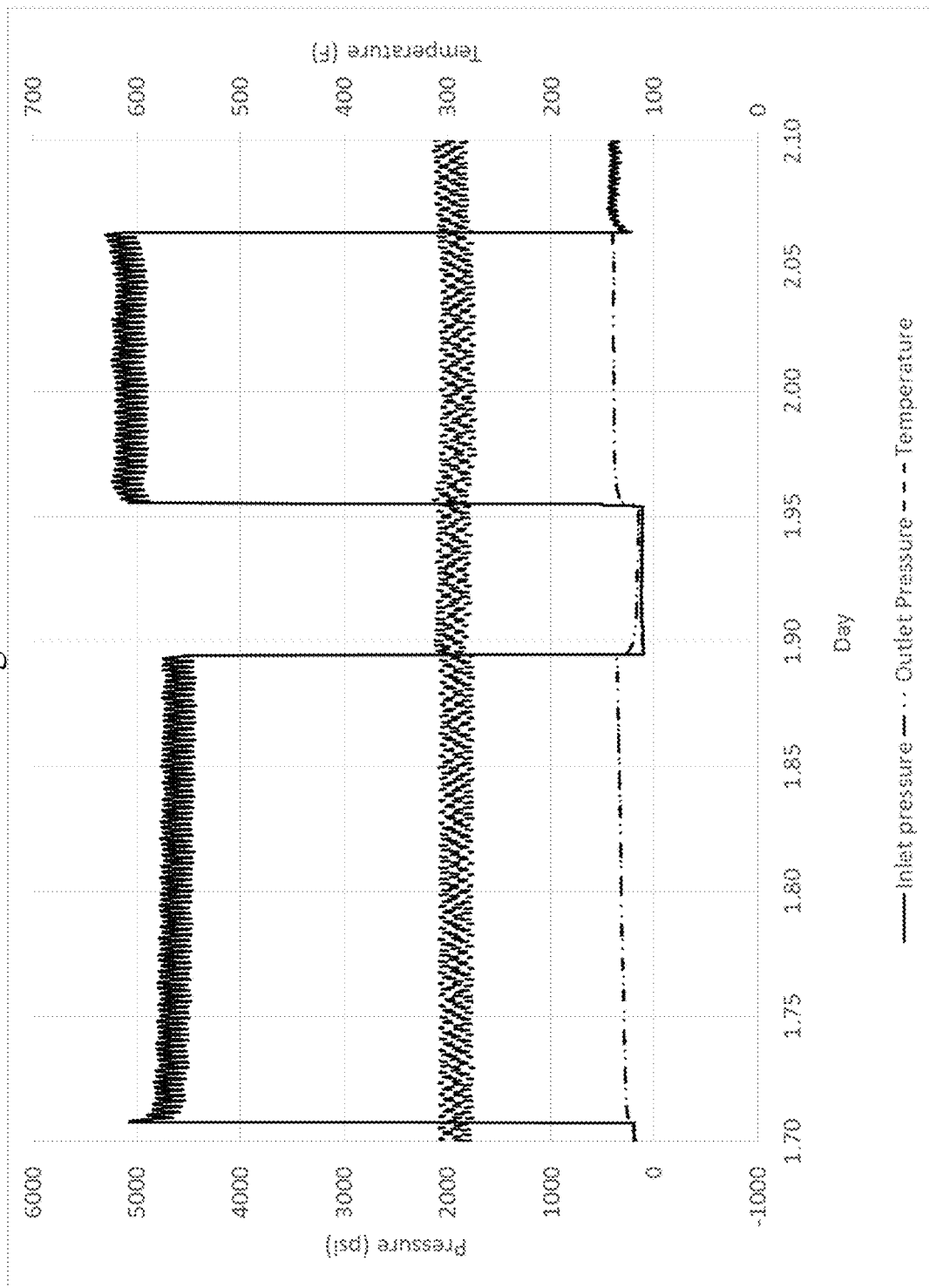
FIG. 10 is a zoom-in section of FIG. 9. This section showed that after the material was heated at 300 F for 1.7 days, the sealing material held 5000 psi at inlet pressure, while no significant leakage was observed at outlet of the tubing.
Figure 11:
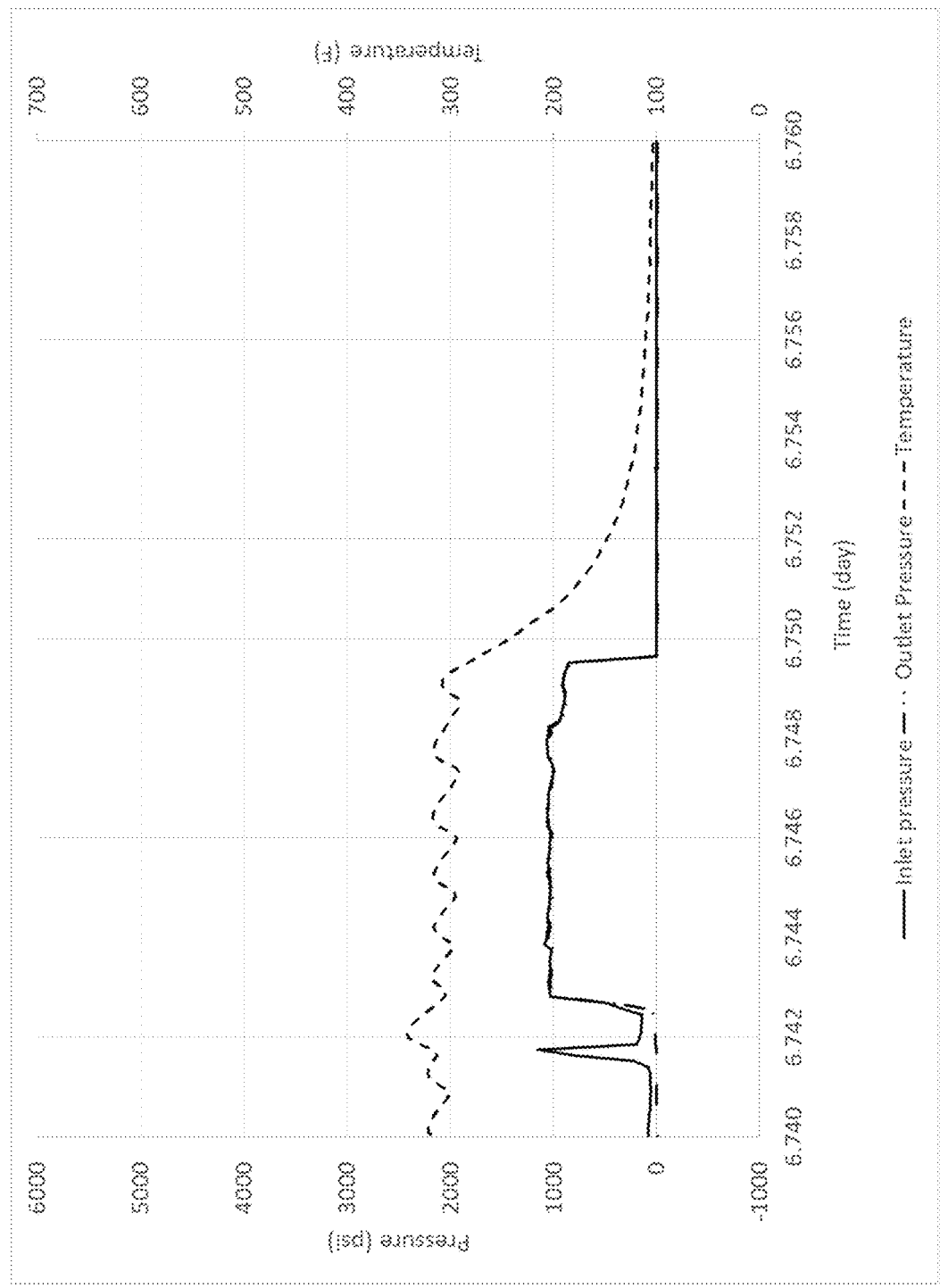
FIG. 11 is a zoom-in section of FIG. 9. This section showed that after the material was heated at 300 F for 6.7 days, when 1000 psi pressure being applied to the inlet end, the pressure observed at the outlet also immediately increased to 1000 psi. This result indicated that the sealing material mostly degraded after 6.7 days at 300 F.

Experiments result indicated that our novel compositions had the ability to hold a 5,000 psi differential pressure at temperature of 300° F. after 1.7 days. The material mostly degraded and held no differential pressure after 6.7 days. (see FIGS. 9-11). The result of this experiment indicates that the sealing material is degradable over time at elevated temperature.

EXAMPLE 9

Figure 12:
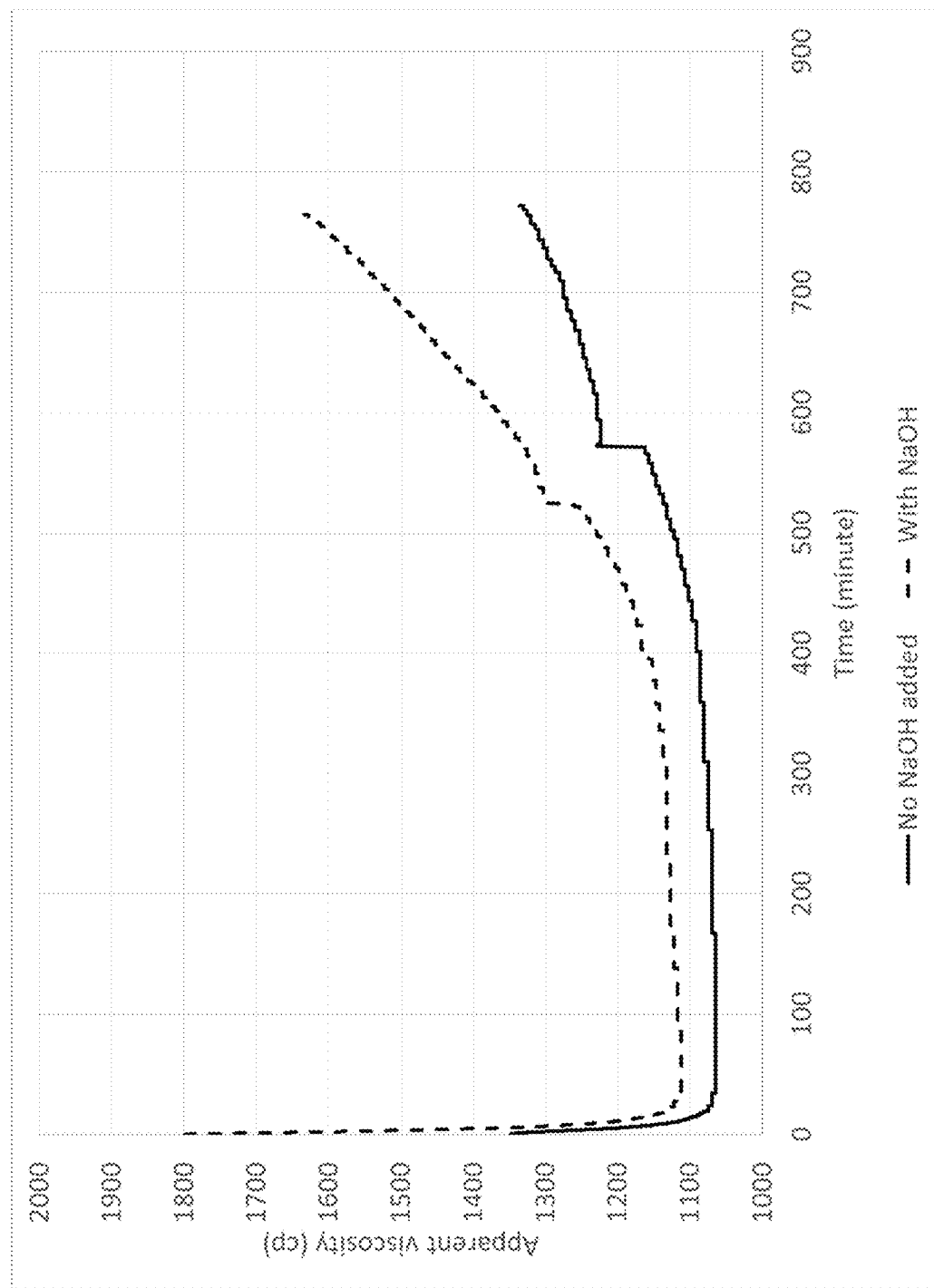
FIG. 12 shows that NaOH is used as accelerator to adjust crosslinking rate. In this set of experiments, the concentration of the polymer and crosslinker remain the same for both tests. Both tests were performed at 90° F. The solid line showed viscosity increase without NaOH, the dotted line showed viscosity increase with NaOH. With NaOH, viscosity increased faster, indicate that crosslink rate is faster with NaOH added.

In this set of experiments, the crosslinking rate was modified using NaOH. The polyacrylamide (molecular weight less than about 100,000) was purchased from Polysciences Inc. Hexamethylenediamine and NaOH were purchased from Sigma-Aldrich. A 70% (w/w) aqueous solution of Hexamethylenediamine was prepared. The compositions were mixed together. The mixture was transferred into the sample cup of the Chandler 5550 rheometer. The cup was heat to 90° F. The apparent viscosity was measured at $15s^{-1}$. The results showed that base can be used to modify the crosslinking reaction rate (FIG. 12).

| Experiment # | Polyacrylamide, 50% (w/w) solution, gram | Hexamethylenediamine, 70% (w/w) solution, gram | $AlCl_3 \cdot 6H_2O$, gram |
|---|---|---|---|
| 22 | 70 | 22.4 | 0 |
| 23 | 70 | 22.4 | 1.8 |

REFERENCES

1. SPE 154582, Engineered Perforation Design Improves Fracture Placement and Productivity in Horizontal Shale Gas Wells, Kirby Jon Walker, Kevin Wutherich, Jay Terry, SPE Americas Unconventional Resources Conference, 5-7 Jun. 2012, Pittsburgh, Pa. USA
2. What we learned from a study of re-fracturing in Barnett Shale: an investigation of completion/fracturing, and production of re-fractured wells, S. Y. Wang, X. L. Luo, R. S. Hurt, Baker Hughes, IPTC 17801, 2013
3. SPE 174959, Modeling of Perforation Erosion for Hydraulic Fracturing Applications, Gongbo Long, Songxia Liu, Guanshui Xu, Sau-Wai Wong, SPE Annual Technical Conference and Exhibition, 28-30 Sep. 2015, Houston, Tex., USA
4. Perforation cluster efficiency of cemented plug and perf limited entry completions; insights from fiber optics diagnostics, G. A. Ugueto C., P. T. Huckabee, M. M. Molenaar, B. W. Wyker, K. Somanchi, Shell Exploration and Production, SPE-179124-MS, 2016
5. Refracturing on horizontal wells in the Eagle Ford shale in south Texas—one operator's perspective, M. Diakhate, A. Gazawi, Pioneer Natural Resources, B. Barree, Barree & Associates, M. Cosslo, B. Tinnin, B. McDonald, G Barzola, Pioneer Natural Resources, SPE-173333-MS, 2015
6. Refracs—why do they work, and why do they fail in 100 published field studies?, M. C. Vincent, SPE, consultant to Carbo Ceramics, Inc., SPE 134330, 2010
7. Understanding the 'frac-hits' impact on a Midland basin tight-oil well production, H. Sun, D. Zhou, C. Adwait, Chevron Energy Technology Company, B. Liang, Chevron North America Exploration and Production Company, URTeC: 2662893, 2017
8. Fracture hit monitoring and its mitigation through integrated 3D modeling in the Wolfcamp stacked pay in the Midland basin, B. Liang, S. Khan, and Y. Tang, Chevron North America Exploration and Production, URTeC 2671336, 2017
9. 3D geomechanical analysis of refracturing of horizontal wells, D. Kumar, A. Ghassemi, Reservoir Geomechanics and Seismicity Research Group, The University of Oklahoma, URTeC: 2697487, 2017
10. Investigation of production-induced stress changes for infill well stimulation in Eagle Ford shale, X. Guo, K. Wu, J. Killough, Texas A&M University, URTeC 2670745, 2017
11. Impact of well spacing and interference on production performance in unconventional reservoirs, Permian basin, F. Ajisafe, I. Solovyeva, A. Morales, E. Ejofodomi, M. Marongiu Porcu; Schlumberger, URTeC: 2690466, 2017
12. Modeling well interference and optimal well spacing in unconventional reservoirs using the fast marching method, J. Huang, F. Olalotiti-Lawal, M. J. King, and A. Datta-Gupta, Texas A&M University, URTeC: 2688841, 2017
13. Protection refrac: analysis of pore pressure and stress change due to refracturing of legacy wells, A. Rezaei, University of Houston, M. Rafiee, Statoil, G. Bornia, Texas Tech University, M. Soliman, University of Houston, S. Morse, Texas Tech University, URTeC: 2667433, 2017
14. Refracturing in the Eagle Ford shale: One operator's quest to identify and rank candidates, minimize well interference, and understand variability of results, R. McFall, Sundance Energy, K. Mullen, J. Baihly, G. Lindsay, and J. Shin, Schlumberger, URTeC 2691375, 2017
15. A systematic study for refracturing modeling under different scenarios in shale reservoirs, R. Jayakumar, R. Rai, A. Boulis, Aura Araque-Martinez, Weatherford, SPE 165677, 2013
16. Lessons learned from refractured wells: using data to develop an engineered approach to rejuvenation, C. Li, J. Han. R. LaFollette, and S. Kotov, Baker Hughes, SPE-179148-MS, 2016
17. Barnett shale horizontal restimulations: A case study of 13 wells, M. Craig, SPE, and S. Wendte, SPE, Devon, J. Buchwalter, SPE, Gemini Solutions, SPE 154669, 2012
18. Renewing mature shale wells through refracturing, T. Jacobs, JPT, April 2014, page 52
19. Overcoming the Impact of Reservoir Depletion to Achieve Effective Parent Well Refracturing, R. Manchanda, M. M. Sharma, University of Texas at Austin, M. Rafiee, L. H. Ribeiro, Statoil USA URTeC: 2693373, 2017
20. Nonplanar Fracture Propagation From a Horizontal Wellbore: Experimental Study, H. H. Abass, Saeed Hedayati, D. L. Meadows, SPE-24823-PA, 1996
21. Experimental study of hydraulic fracture geometry initiated from horizontal wells, W. El Rabaa, Halliburton, SPE-19720-MS, 1989
22. Hydraulic fracture initiation from horizontal wellbores: laboratory experiments, C. M. Kim, H. H. Abass, Halliburton, ARMA-91-231 1991
23. Proper use of proppant slugs and viscous gel slugs can improve proppant placement during hydraulic fracture applications, B. W. McDaniel, D. E McMechen, N. A. Stegent, Halliburton, SPE 71661, 2001
24. Refracturing horizontal shale wells with solid-steel expandable liners, J. Cameron, Enventure Global Technology, World Oil, August 3013, page 39
25. Barnett shale refracture stimulations using a novel diversion technique, D. I. Potapenko, S. K. Tinkham, B. Lecerf, C. N. Fredd, M. L. Samuelson, M. R. Gillard, J. H. Le Calvez, and J. L. Daniels, Schlumberger, SPE 119636, 2009
26. Lessons learned: refracs from 1980 to present, B. Grieser, J. Calvin, Halliburton, J. Dulin, SPE-179152-MS, 2016
27. Leveraging subsurface insight, screening, and diversion technology in refracturing, Doug Walser, Halliburton, JPT, January 2016, page 25
28. Re-fracturing horizontal shale wells: case history of a Woodford shale pilot project, S. French, SPE, J Rodgerson, SPE, and C. Feik, SPE, BP America Production Company, SPE 168607, 2014
29. Restimulation design considerations and case studies of Haynesville Shale, J. Melcher, S. Persac, A. Whitsett, Halliburton, SPE-174819, 2015
30. Restimulation of wells using biodegradable particulates as temporary diverting agents, D. Allison, S. Curry, and B. Todd, Halliburton, CSUG/SPE 149221, 2011

What is claimed is:
1. A method of re-fracturing a wellbore comprising:
identifying fractured perforations in the wellbore based on injection pressure data;
injecting a sealant composition into the fractured perforations;
sealing off the fractured perforations; and
re-fracturing perforations that are not sealed, wherein the sealant composition comprises at least one crosslinkable polymer or copolymer and at least one crosslinking agent, wherein the at least one crosslinkable polymer or copolymer includes a polyethylenimine having a molecular weight of less than 100,000 Daltons, polyacrylic acid having an average molecular weight of less than 400,000 Daltons, polymethylacrylate having a molecular weight of less than 400,000 Daltons, polyacrylamide having a molecular weight of less than 100,000 Daltons, and combinations thereof; and wherein the crosslinking agent includes ethylenediamine, hexamethylenediamine, hexamethylenetetramine, polyethylenimine having a molecular weight less than 100,000 Daltons, succinic acid, citric acid, or mixtures thereof.

2. The method of claim 1, wherein said re-fracturing is done at, above or below a region where previously fractured perforations are located.

3. The method of claim 1, wherein the crosslinking agent is degradable over time, thereby making the sealant composition degradable.

4. The method of claim 1, wherein said crosslinking reaction is further controlled by a pH agent comprising protonic acid, Lewis acid, base, or Lewis base.

5. The method of claim 4, wherein said pH agent is selected from the group consisting of hydrochloric acid, sulfuric acid, phosphoric acid, acetic acid, acetoacetic acid, and citric acid.

6. The method of claim 4, wherein said pH agent is selected from the group consisting of aluminum chloride, zinc chloride, copper chloride, copper sulfate, and iron trichloride.

7. The method of claim 4, wherein said pH agent is selected from the group consisting of NaOH, KOH, ammonia, hydrazine, and pyridine.

8. The method of claim 1, wherein the sealant composition further comprises a degradable or non-degradable particulate diversion material.

9. The method of claim 1, wherein said re-fracturing comprises bullhead treatment, bullhead with diversion, plug-and-perf method, fracture with coil tubing, sliding or sleeve.

10. The method of claim 1, further comprising:
running well intervention equipment in the wellbore; and
setting a straddle packer across several perforation holes.

11. A method of re-fracturing a wellbore comprising:
running well intervention equipment in the wellbore;
setting a straddle packer across several perforation holes;
identifying fractured perforations in the wellbore based on injection pressure data;
injecting a sealant composition into the fractured perforations;
sealing off the fractured perforations; and
re-fracturing perforations that are not sealed,
wherein the sealant composition comprises at least one crosslinkable polymer or copolymer and at least one crosslinking agent,
wherein the at least one crosslinkable polymer or copolymer includes a polyethylenimine having a molecular weight of less than 100,000 Daltons, polyacrylic acid having an average molecular weight of less than 400,000 Daltons, polymethylacrylate having a molecular weight of less than 400,000 Daltons, polyacrylamide having a molecular weight of less than 100,000 Daltons, and combinations thereof; and
wherein the crosslinking agent includes ethylenediamine, hexamethylenediamine, hexamethylenetetramine, polyethylenimine having a molecular weight less than 100,000 Daltons, succinic acid, citric acid, or mixtures thereof.

12. The method of claim 11, wherein the well intervention equipment includes coil tubing, tubing, or drill pipes.

* * * * *